United States Patent
Shin et al.

(10) Patent No.: US 12,477,477 B2
(45) Date of Patent: Nov. 18, 2025

(54) METHOD AND APPARATUS FOR SIDELINK POSITIONING IN WIRELESS COMMUNICATION SYSTEM

(71) Applicant: Samsung Electronics Co., Ltd., Gyeonggi-do (KR)

(72) Inventors: Cheolkyu Shin, Gyeonggi-do (KR); Youngbum Kim, Gyeonggi-do (KR); Hyunseok Ryu, Gyeonggi-do (KR); Kyoungmin Park, Gyeonggi-do (KR)

(73) Assignee: Samsung Electronics Co., Ltd., Seoul (KR)

( * ) Notice: Subject to any disclaimer, the term of this patent is extended or adjusted under 35 U.S.C. 154(b) by 234 days.

(21) Appl. No.: 18/343,964

(22) Filed: Jun. 29, 2023

(65) Prior Publication Data

US 2024/0007968 A1    Jan. 4, 2024

(30) Foreign Application Priority Data

Jun. 29, 2022 (KR) .......................... 10-2022-0080059

(51) Int. Cl.
*H04W 52/34* (2009.01)
*H04W 28/02* (2009.01)
(Continued)

(52) U.S. Cl.
CPC ....... *H04W 52/343* (2013.01); *H04W 52/325* (2013.01); *H04W 52/367* (2013.01); *H04W 52/383* (2013.01); *H04W 28/0289* (2013.01)

(58) Field of Classification Search
CPC ............. H04W 52/343; H04W 52/325; H04W 52/367; H04W 52/383; H04W 28/0289
See application file for complete search history.

(56) References Cited

U.S. PATENT DOCUMENTS

| 11,943,156 | B2 * | 3/2024 | Nam ..................... H04W 72/20 |
| 2020/0045674 | A1 * | 2/2020 | Tseng ................... H04W 76/14 |

(Continued)

FOREIGN PATENT DOCUMENTS

| WO | WO 2021/034076 | 2/2021 |
| WO | WO 2021/221362 | 11/2021 |

(Continued)

OTHER PUBLICATIONS

Qualcomm Incorporated, "Potential Solutions for Sidelink Positioning", R1-2205038, 3GPP TSG RAN WG1 #109-e, May 9-20, 2022, 11 pages.

(Continued)

*Primary Examiner* — Lewis G West
(74) *Attorney, Agent, or Firm* — The Farrell Law Firm, P.C.

(57) ABSTRACT

The disclosure relates to a 5G or 6G communication system for supporting a higher data transmission rate. A method performed by a first UE in a wireless communication system includes identifying a transmission power for an SL-PRS based on a maximum power for a congestion control, and transmitting, to a second UE, the SL-PRS on an SL BWP based on the transmission power. In case that a resource for the SL-PRS is also used by a PSSCH, the maximum power for the congestion control is identified based on a CBR measured for the PSSCH and a priority level.

16 Claims, 18 Drawing Sheets

(51) Int. Cl.
*H04W 52/32* (2009.01)
*H04W 52/36* (2009.01)
*H04W 52/38* (2009.01)

(56) References Cited

U.S. PATENT DOCUMENTS

| | | | |
|---|---|---|---|
| 2020/0336872 A1 | 10/2020 | Basu Mallick et al. | |
| 2021/0029685 A1* | 1/2021 | Liu | H04W 52/283 |
| 2021/0385760 A1* | 12/2021 | Guo | H04W 52/367 |
| 2022/0110074 A1* | 4/2022 | Zhao | H04W 52/383 |
| 2022/0278797 A1* | 9/2022 | Lee | H04W 92/18 |
| 2023/0198708 A1 | 6/2023 | Hong et al. | |
| 2023/0337171 A1 | 10/2023 | Baek et al. | |
| 2023/0397150 A1 | 12/2023 | Baek et al. | |
| 2024/0406931 A1* | 12/2024 | Sahin | H04W 64/006 |
| 2025/0008531 A1* | 1/2025 | Park | H04L 1/189 |
| 2025/0024411 A1* | 1/2025 | Jiang | H04W 72/02 |
| 2025/0081212 A1* | 3/2025 | Yu | H04W 72/25 |
| 2025/0106872 A1* | 3/2025 | Roth | H04L 5/0048 |
| 2025/0185055 A1* | 6/2025 | Elshafie | H04B 7/0617 |

FOREIGN PATENT DOCUMENTS

| | | |
|---|---|---|
| WO | WO 2022/059887 | 3/2022 |
| WO | WO 2022/085894 | 4/2022 |
| WO | WO 2023/003361 | 1/2023 |

OTHER PUBLICATIONS

Moderator (Qualcomm), "Moderator Summary #2 for [109-e-R18-Pos-04] Email Discussion on Potential Solutions for SL Positioning", R1-2205457, 3GPP TSG RAN WG1 #109-e, May 9-20, 2022, 153 pages.

International Search Report dated Oct. 13, 2023 issued in counterpart application No. PCT/KR2023/009155, 7 pages.

ZTE, "Discussion on Potential Solutions for SL Positioning", R1-2203624, 3GPP TSG RAN WG1 #109-e, May 9-20, 2022, 11 pages.

Moderator (Qualcomm), "Moderator Summary #1 for [109-e-R18-Pos-04] Email Discussion on Potential Solutions for SL Positioning", R1-2205202,.

3GPP TSG RAN WG1 #109-e, May 9-20, 2022, 113 pages.

European Search Report dated Sep. 30, 2025 issued in counterpart application No. 23831934.7-1206, 9 pages.

* cited by examiner

METHOD AND APPARATUS FOR SIDELINK POSITIONING IN WIRELESS COMMUNICATION SYSTEM

CROSS-REFERENCE TO RELATED APPLICATION(S)

This application is based on and claims priority under 35 U.S.C. § 119 to Korean Patent Application No. 10-2022-0080059, filed on Jun. 29, 2022, in the Korean Intellectual Property Office, the disclosure of which is incorporated herein by reference in its entirety.

BACKGROUND

1. Field

The disclosure relates generally to a wireless communication system, and more particularly, to a method and an apparatus for performing positioning or location measurement via a sidelink (SL) in the wireless communication system.

2. Description of Related Art

Fifth generation (5G) mobile communication technologies define broad frequency bands such that high transmission rates and new services are possible, and can be implemented not only in sub 6 gigahertz (GHz) bands such as 3.5 GHz, but also in above 6 GHz bands referred to as millimeter wave (mmWave) bands including 28 GHz and 39 GHz. In addition, it has been considered to implement sixth generation (6G) mobile communication technologies referred to as beyond 5G systems in terahertz (THz) bands, such as 95 GHz to 3 THz bands, to achieve transmission rates fifty times faster than 5G mobile communication technologies and ultra-low latencies one-tenth of 5G mobile communication technologies.

At the outset of the 5G mobile communication technology development, in order to support services and to satisfy performance requirements in connection with enhanced mobile broadband (eMBB), ultra reliable low latency communications (URLLC), and massive machine-type communications (mMTC), there has been ongoing standardization regarding beamforming and massive MIMO for mitigating radio-wave path loss and increasing radio-wave transmission distances in mmWave, supporting numerologies such as operating multiple subcarrier spacings for efficiently utilizing mmWave resources and dynamic operation of slot formats, initial access technologies for supporting multi-beam transmission and broadbands, definition and operation of bandwidth part (BWP), new channel coding methods such as a low density parity check (LDPC) code for large amount of data transmission and a polar code for highly reliable transmission of control information, layer 2 (L2) pre-processing, and network slicing for providing a dedicated network specialized to a specific service.

There are ongoing discussions regarding improvement and performance enhancement of initial 5G mobile communication technologies in view of services to be supported by 5G mobile communication technologies, and there has been physical layer standardization regarding technologies such as vehicle-to-everything (V2X) for aiding driving determination by autonomous vehicles based on information regarding positions and states of vehicles transmitted by the vehicles and for enhancing user convenience, new radio unlicensed (NR-U) aimed at system operations conforming to various regulation-related requirements in unlicensed bands, NR user equipment (UE) power saving, non-terrestrial network (NTN) which is UE-satellite direct communication for providing coverage in an area in which communication with terrestrial networks is unavailable, and positioning.

Moreover, there has been ongoing standardization in air interface architecture/protocol regarding technologies such as the industrial Internet of things (IIoT) for supporting new services through interworking and convergence with other industries, integrated access and backhaul (IAB) for providing a node for network service area expansion by supporting a wireless backhaul link and an access link in an integrated manner, mobility enhancement including conditional handover and dual active protocol stack (DAPS) handover, and two-step random access channel for simplifying random access procedures (2-step RACH for NR). There also has been ongoing standardization in system architecture/service regarding a 5G baseline architecture (for example, service based architecture or service based interface) for combining network functions virtualization (NFV) and software-defined networking (SDN) technologies, and mobile edge computing (MEC) for receiving services based on UE positions.

As 5G mobile communication systems are commercialized, connected devices that have been exponentially increasing will be connected to communication networks, and it is accordingly expected that enhanced functions and performances of 5G mobile communication systems and integrated operations of connected devices will be necessary. To this end, new research is scheduled in connection with extended reality (XR) for efficiently supporting augmented reality (AR), virtual reality (VR), and mixed reality (MR), 5G performance improvement and complexity reduction by utilizing artificial intelligence (AI) and machine learning (ML), AI service support, metaverse service support, and drone communication.

Such development of 5G mobile communication systems will serve as a basis for developing not only new waveforms for providing coverage in terahertz bands of 6G mobile communication technologies, multi-antenna transmission technologies such as full dimensional multiple input multiple output (FD-MIMO), array antennas and large-scale antennas, metamaterial-based lenses and antennas for improving coverage of terahertz band signals, high-dimensional space multiplexing technology using orbital angular momentum), and reconfigurable intelligent surface (RIS), but also full-duplex technology for increasing frequency efficiency of 6G mobile communication technologies and improving system networks, AI-based communication technology for implementing system optimization by utilizing satellites and AI from the design stage and internalizing end-to-end AI support functions, and next-generation distributed computing technology for implementing services at levels of complexity exceeding the limit of UE operation capability by utilizing ultra-high-performance communication and computing resources.

As discussed above, a solution for seamlessly providing various services is demanded with the advance of the wireless communication system. In this regard, there is a need in the art for a solution for smooth operation of a multi-sip terminal is demanded.

SUMMARY

The disclosure relates to a wireless communication system, and particularly, a method and an apparatus for performing positioning (or measuring a location) via a sidelink in the wireless communication system. In detail, methods for performing power control in positioning via the sidelink may be suggested.

The disclosure has been made to address at least the above-mentioned problems and/or disadvantages and to provide at least the advantages described below.

Accordingly, an aspect of the disclosure is to provide a method and a procedure of a terminal for performing power control in positioning (or measuring a location) via the SL, such that positioning accuracy of the SL may be improved in the wireless or mobile communication system.

In accordance with an aspect of the disclosure, a method performed by a first UE in a wireless communication system includes identifying a transmission power for an SL-positioning reference signal (SL-PRS or S-PRS) based on a maximum power for a congestion control, and transmitting, to a second UE, the SL-PRS on a SL BWP based on the transmission power. In case that a resource for the SL-PRS is also used by a physical SL shared channel (PSSCH), the maximum power for the congestion control is identified based on a channel busy ratio (CBR) measured for the PSSCH and a priority level.

In accordance with an aspect of the disclosure, a first UE in a wireless communication system is provided. The first UE comprises a transceiver and a controller coupled with the transceiver and configured to identify a transmission power for an SL-PRS based on a maximum power for a congestion control, and transmit, to a second UE, the SL-PRS on a SL BWP based on the transmission power. In case that a resource for the SL-PRS is also used by a PSSCH, the maximum power for the congestion control is identified based on a CBR measured for the PSSCH and a priority level.

In accordance with an aspect of the disclosure, a method performed by a second user equipment (UE) in a wireless communication system is provided. The method comprises receiving, from a first UE, a first SL-PRS on an SL BWP, and transmitting, to the first UE, a second SL-PRS as a response of the first SL-PRS. A transmission power for the first SL-PRS is based on a maximum power for a congestion control. In case that a resource for the first SL-PRS is also used by a PSSCH, the maximum power for the congestion control is based on a CBR measured for the PSSCH and a priority level.

In accordance with an aspect of the disclosure, a second UE in a wireless communication system comprises a transceiver and a controller coupled with the transceiver and configured to receive, from a first UE, a first SL-PRS on an SL BWP, and transmit, to the first UE, a second SL-PRS as a response of the first SL-PRS. A transmission power for the first SL-PRS is based on a maximum power for a congestion control. In case that a resource for the first SL-PRS is also used by a PSSCH, the maximum power for the congestion control is based on a CBR measured for the PSSCH and a priority level.

The disclosure provides a method and a procedure of a terminal for performing power control in positioning (or measuring a location) via the sidelink. According to embodiments, positioning accuracy of the sidelink may be improved in the wireless communication system (or a mobile communication system)

BRIEF DESCRIPTION OF THE DRAWINGS

The above and other aspects, features and advantages of certain embodiment of the disclosure will be more apparent from the following detailed description, taken in conjunction with the accompanying drawings, in which.

DETAILED DESCRIPTION

Figure 1A:
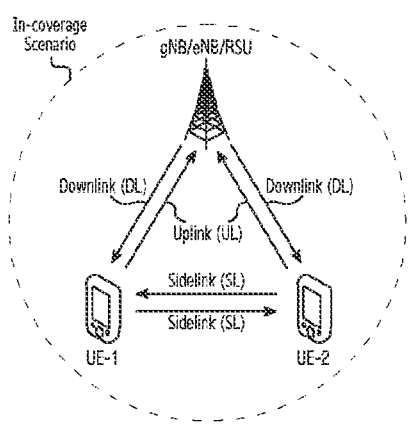
FIG. 1A illustrates an SL system according to an embodiment.

Hereinafter, embodiments of the disclosure are described in detail with reference to the accompanying drawings.

In describing the embodiments, technical contents well known in the technical field to which the disclosure pertains and which are not directly related to the disclosure will be omitted for the sake of clarity and conciseness.

For the same reason, some components in the accompanying drawings are exaggerated, omitted, or schematically illustrated, and a size of each component does not entirely reflect an actual size. The same reference number is given to the same or corresponding element in each drawing.

Advantages and features of the disclosure, and methods for achieving them will be clarified with reference to embodiments described below in detail together with the accompanying drawings. However, the disclosure is not limited to the embodiments disclosed below but may be implemented in various different forms, the embodiments are provided to only complete the scope of the disclosure and to allow those skilled in the art to which the disclosure pertains to fully understand a category of the disclosure. The same reference numeral refers to the same element throughout the specification.

At this time, it will be understood that each block of the process flowchart illustrations and combinations of the flowchart illustrations may be executed by computer program instructions. Since these computer program instructions may be mounted on a processor of a general purpose computer, a special purpose computer or other programmable data processing apparatus, the instructions executed by the processor of the computer or other programmable data processing equipment may generate means for executing functions described in the flowchart block(s). Since these computer program instructions may also be stored in a computer-usable or computer-readable memory which may direct a computer or other programmable data processing equipment to function in a particular manner, the instructions stored in the computer-usable or computer-readable memory may produce a manufacture article including instruction means which implement the function described in the flowchart block(s). Since the computer program instructions may also be loaded on a computer or other programmable data processing equipment, a series of operational steps may be performed on the computer or other programmable data processing equipment to produce a computer-executed process, and thus the instructions performing the computer or other programmable data processing equipment may provide steps for executing the functions described in the flowchart block(s).

In addition, each block may represent a portion of a module, a segment or code which includes one or more executable instructions for implementing a specified logical function(s). Also, it should be noted that the functions mentioned in the blocks may occur out of order in some alternative implementations. For example, two blocks shown in succession may in fact be executed substantially concurrently or the blocks may sometimes be executed in the reverse order depending on corresponding functionality.

The term "unit" as used herein indicates software or a hardware component such as a field programmable gate array (FPGA) or an application-specific integrated circuit (ASIC), and unit performs specific roles. However, unit is not limited to software or hardware. unit may be configured to reside on an addressable storage medium and configured to reproduce on one or more processors. Accordingly, unit may include components such as software, object-oriented software, class and task components, processes, functions, attributes, procedures, sub-routines, segments of program code, drivers, firmware, microcode, circuitry, data, databases, data structures, tables, arrays, and variables. The functionalities provided in the components and unit may be combined to fewer components and units or may be further separated into additional components and units. The components and units may be implemented to reproduce one or more central processing units (CPUs) within a device or a security multimedia card. A unit may include one or more processors.

Embodiments of the disclosure are mainly based on new radio access network (RAN) NR and a packet core (e.g., a 5G system, a 5G core network, or a next generation (NG) core) which is a core network on 5G mobile communication standards specified by 3rd generation partnership project (3GPP) which is a mobile communication standardization organization, but aspects of the disclosure may be applied to other communication systems having a similar technical background with slight modification without departing from the scope of the disclosure.

In the 5G system, to support network automation, a network data collection and analysis function (NWDAF) of analyzing data collected in the 5G network and providing the analyzed data, may be defined. The NWDAF may collect/store/analyze information from the 5G network and provide a result to an unspecified network function (NF), and the analysis result may be independently used in each NF.

Terms and names defined in the 3GPP standard (standards for 5G, NR, long term evolution (LTE), or a similar system) may be used herein for the convenience of description. However, the disclosure is not limited by these terms and names and may be applied in the same manner to a system conforming to other standards.

Terms for identifying access nodes, indicating network entities, indicating messages, indicating interfaces between network entities, and indicating various identification information are illustratively used in the description for the sake of convenience. The disclosure is not limited by the terms as used, and other terms indicating subjects having equivalent technical meanings may be used.

To meet a wireless data traffic demand which is increasing after fourth generation (4G) communication system commercialization, efforts are being made to develop an improved 5G communication system (or NR). To achieve a high data transmission rate, the 5G communication system is designed to support in a 28 GHz frequency band. The 5G communication system is based on technologies such as beamforming, MIMO, full dimensional (FD)-MIMO, array antenna, analog beam-forming, and large scale antenna, to mitigate a propagation path loss in the mmWave band and to increase a propagation transmission distance. Unlike LTE, the 5G communication system includes 15 kilohertz (kHz) to support various subcarrier spacings such as 30 kHz, 60 kHz, and 120 kHz, a physical control channel using polar coding and a physical data channel using LDPC. Along with discrete Fourier transform (DFT)-spread (S)-orthogonal frequency-division multiplexing (OFDM), cyclic prefix (CP)-OFDM is used as a waveform for uplink transmission. The LTE may support hybrid automatic repeat request (HARQ) retransmission based on a transport block (TB), whereas 5G may additionally support HARQ retransmission based on a code block group (CBG) by combining code blocks (CBs).

For network enhancement of the system, the 5G communication system develops techniques such as evolved small cell, advanced small cell, cloud RAN, ultra-dense network, device to device (D2D) communication, wireless backhaul, a V2X network, cooperative communication, coordinated multi-points (CoMP), and receive interference cancellation.

The Internet is evolving from a human-centered connection network in which humans create and consume information, to an Internet of things (IoT) network which exchanges and processes information between distributed components such as objects. Internet of everything (IoE) technology which combines IoT technology with big data processing technology through connection with a cloud server is also emerging. To implement the IoT, technology elements such as sensing technology, wired and wireless communication and network infrastructure, service interface technology, and security technology are required, and techniques such as a sensor network for connection between objects, machine to machine (M2M), and machine type communication (MTC) have been studied. The IoT environment may provide an internet technology (IT) service which creates new values in human life by collecting and analyzing data generated from the connected objects. The IoT environment may be applied to fields such as a smart home, a smart building, a smart city, a smart car or a connected car, a smart grid, health care, smart home appliances, and advanced medical services through convergence and combination between the existing IT technology and various industries.

Accordingly, a technology such as a sensor network, M2M communication, and MTC is implemented by the 5G communication technology such as beamforming, MIMO, and array antennas. Applying the cloud RAN as the big data processing technology as described above may be an example of convergence of the 5G technology and the IoT technology. As such, a plurality of services may be provided to a user in a communication system, and to do so, there is a need in the art for a method for providing each service according to characteristics within the same time interval and an apparatus using the same. Among various services provided in the 5G communication system is a service satisfying low latency and high reliability requirements. In addition, the demand for mobile services is ever increasing, and a location based service (LBS) which is mainly driven by two main requirements of an emergency service and a commercial application is rapidly growing. In particular, in communication using an SL, an NR SL system supports unicast communication, groupcast (or multicast) communication, and broadcast communication between terminals. Unlike the LTE SL which aims to transmit and receive basic safety information required for driving a vehicle on a road, the NR SL aims to provide more advanced services such as platooning, advanced driving, extended sensor, and remote driving.

Particularly, the NR SL may perform positioning through an SL between terminals. In other words, a method of measuring a location of a terminal by using a positioning signal transmitted via the SL may be considered. A conventional method of measuring a location of a terminal by using a positioning signal transmitted through a downlink and an uplink between a terminal and a base station is feasible only if the terminal is within coverage area of the base station. However, if the SL positioning is introduced, the location of the terminal may be measured even though the terminal is out of the coverage area of the base station. Specifically, the SL positioning may be performed by transmitting the following signals. However, the SL positioning signal is not limited to an SL-PRS, a measurement report, and a location information transfer.

The SL-PRS of the positioning signals is transmitted by the terminal to enable the positioning measurement, the terminal receiving the SL-PRS may perform the positioning measurement using the signal, and the measurement using the SL-PRS may differ depending on the positioning method. The terminal measuring the positioning may transmit corresponding measurement information to another terminal, the base station or a location server (LS), which is referred to as a measurement report. The location information transfer indicates that known location information of the terminal is indicated to another terminal. Using the known location information of the terminal, the terminal may measure a relative position and an absolute position. Besides the known location information of the terminal, additional information required for the SL positioning may be exchanged between terminals. For example, reliability of the known location information may be included. The terminal may allocate a resource for the positioning signal transmission and transmit the positioning signals in the allocated resources. The positioning via the SL may consider a method for performing power control on the SL-PRS. For example, the power may be increased if a distance between SL terminals increases, and may be decreased if the distance between SL terminals decreases. In the SL-PRS power control, the power control method may be determined according to an SL-PRS pattern, that is, how the corresponding signal is mapped to the transmission resource in the time and the frequency and transmitted. In addition, a congestion control method of the SL-PRS may be performed independently of congestion control of the existing PSSCH channel. The congestion control may affect the power control, which may affect the power control method of the SL-PRS. The disclosure suggests a power control method of the SL-PRS by considering this. The disclosure may improve SL-PRS transmission and reception performance through the SL-PRS power control and thus improve accuracy of the positioning measurement.

Embodiments of the disclosure are suggested to support the above scenario, and particularly are to provide a method and an apparatus for performing congestion control and power control in measuring (or, positioning) a terminal location in the SL.

FIG. 1A illustrates an SL system according to an embodiment.

Referring to FIG. 1A, an example of in-coverage (IC) in which all UEs (a UE-1 and a UE-2) communicating via the SL are positioned within coverage of a base station is illustrated. All the UEs, e.g., UE-1 and UE-2, may receive data and control information from the base station via a downlink (DL) or transmit data and control information to the base station via an uplink (UL). The data and the control information may be for SL communication and may be data and control information for general cellular communication. In addition, the UEs may transmit and/or receive data and control information for corresponding communication via the SL.

Figure 1B:
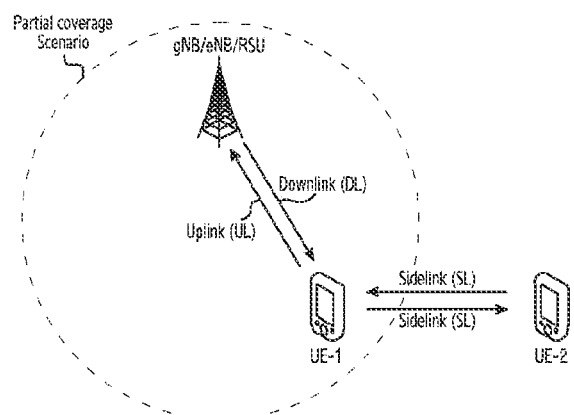
FIG. 1B illustrates an SL system according to an embodiment.

FIG. 1B illustrates an SL system according to an embodiment.

Referring to FIG. 1B, an example in which UE-1 of the UEs is positioned in the base station coverage and UE-2 is positioned out of the base station coverage is illustrated. That is, FIG. 1B illustrates the example of partial coverage (PC) in which some UE (e.g., the UE-2) is out of the base station coverage. According to an embodiment, a first UE (e.g., the UE-1) positioned in the base station coverage may receive data and control information from the base station via the DL or transmit data and control information to the base station via the UL. A second UE (e.g., UE-2) positioned out of the base station coverage may not receive data and control information from the base station via the DL and may not transmit data and control information to the base station via the UL. The second UE (e.g., UE-2) may transmit and/or receive data and control information for corresponding communication to/from the first UE (e.g., UE-1) via the SL.

Figure 1C:
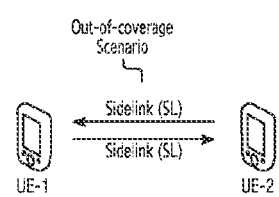
FIG. 1C illustrates an SL system according to an embodiment.

FIG. 1C illustrates an SL system according to an embodiment.

Referring to FIG. 1C, an example of out-of coverage (OOC) in which all the UEs are positioned out of the base station coverage is illustrated. According to an embodiment, the UEs (e.g., UE-1 and UE-2) may not receive data and control information from the base station via the DL, and may not transmit data and control information to the base station via the UL. The UEs (e.g., UE-1 and the UE-2) may transmit and/or receive data and control information via the SL.

Figure 1D:
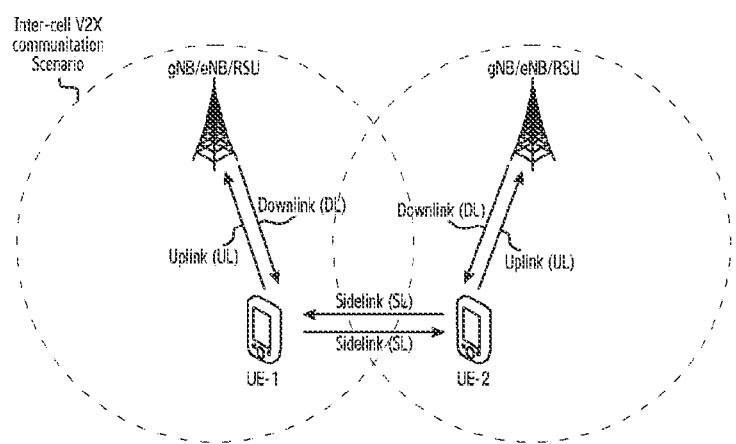
FIG. 1D illustrates an SL system according to an embodiment.

FIG. 1D illustrates an SL system according to an embodiment.

Referring to FIG. 1D, an example of a scenario of performing SL communication between UEs (e.g., UE-1 and UE-2) positioned in different cells is illustrated. Specifically, FIG. 1D illustrates that the UEs (e.g., UE-1 and the UE-2) access different base stations (a radio resource control (RRC) connected state) or are camping on different base stations (an RRC disconnected or idle state).

UE-1 may transmit a signal in the SL and UE-2 may receive the signal. Alternatively, UE-1 may receive a signal in the SL, and UE-2 may transmit the signal. UE-1 may receive a system information block (SIB) from the base station which UE-1 accesses or on which UE-1 is camping, and UE-2 may receive a SIB from another base station which UE-2 accesses or on which UE-2 is camping. The SIB may use an existing SIB or a separate SIB defined for the SL communication. SIB information received by UE-1 and SIB information received by UE-2 may differ from each other. Hence, to perform the SL communication between UE-UE-1 and UE-2 positioned in different cells, a method of interpreting SIB information transmitted from different cells by unifying the information or signaling the information may be additionally required. For example, the SIB information received by UE-1 and the SIB information received by UE-2) may be unified, or the SIB information received by UE-1 may be signaled to UE-2, and accordingly UE-2 may need to further analyze the SIB information transmitted form the different cell of UE-1.

FIG. 1A through FIG. 1D illustrate the SL system including UE-1 and UE-2 for convenience of description, but the disclosure is not limited thereto, and the communication may be performed between more UEs. For example, the communication may be conducted between UE-1, UE-2 and a third UE. The interface (e.g., the UL and the DL) between the base station and the UEs may be referred to as an Uu interface, and the SL communication between the UEs may be referred to as a PC5 interface. Hence, the Uu interface and the PC5 interface may be interchangeably used in the disclosure. For example, the UEs of the disclosure may perform wireless communication via the Uu interface and wireless communication via the PC5 interface together or individually. Meanwhile, the UE may indicate a general terminal and a V2X supporting terminal. For example, the general terminal may indicate a terminal supporting the wireless communication. For example, the UE of the disclosure may indicate a handset (e.g., a smartphone) of a pedestrian, or may include a vehicle supporting vehicle-to-vehicle (V2V) communication, a vehicle supporting vehicle-to-pedestrian (V2P) communication, a vehicle supporting vehicle-to-network (V2N) communication and/or a vehicle supporting vehicle-to-infrastructure (V2I) communication. The UE of the disclosure may include a road side unit (RSU) having UE functionality, an RSU having base station functionality, and/or an RSU having a part of base station functionality and a part of UE functionality. The base station may support both the V2X communication and general cellular communication or may support only the V2X communication. The base station may be a 5G gNodeB (gNB), a 4G eNodeB (eNB), or an RSU.

Figure 2:
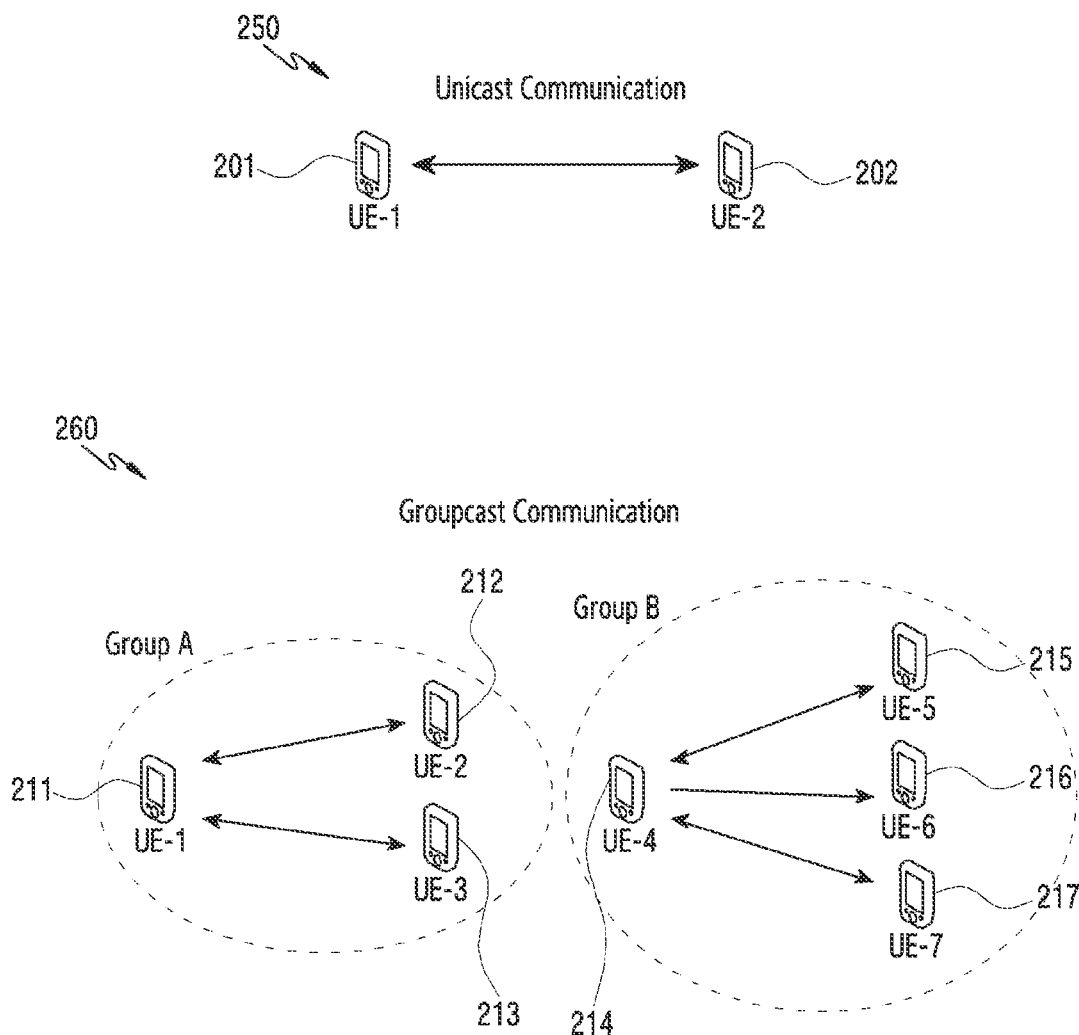
FIG. 2 illustrates a communication scheme via an SL according to an embodiment.

FIG. 2 illustrates a communication scheme via an SL according to an embodiment.

Referring to a unicast communication example 250 of FIG. 2, UE-1 201 (e.g., a Tx UE) and UE-2 202 (e.g., an Rx UE) may perform one-to-one communication, referred to as the unicast communication. In the SL, the UEs may exchange capability information and configuration information through PC5-RRC defined in a unicast link of the unicast communication performed between the UEs. The UEs may exchange the configuration information through an SL medium access control (MAC) control element (CE) defined in the unicast link therebetween.

In a groupcast communication example 260 of FIG. 2, A Tx UE and Rx UEs may perform one-to-many communication, referred to as groupcast or multicast. In the example 260 of FIG. 2, UE-1 211, UE-2 212 and/or UE-3 213 may perform the groupcast communication by forming one group (e.g., group A), and UE-4 214, UE-5 215, UE-6 216 and/or UE-7 217 may perform the groupcast communication by forming another group (e.g., group B). Each UE may perform the groupcast communication only within its group, and communication between different groups may be performed through the unicast, the groupcast, and/or broadcast communication. The two groups (e.g., the group A and the group B) are formed in the example 260 of FIG. 2, which is merely exemplary, and the groupcast communication and the number of the groups or the group names for the groupcast communication of the disclosure are not limited thereto.

The UEs may perform the broadcast communication in SLs in FIG. 2. The broadcast communication may indicate communication in which data and control information transmitted by a Tx UE in the SL are received by all other UEs. For example, assuming that UE-1 211 is the Tx terminal for the broadcast in example 260 of FIG. 2, all of UE-UE-2 212, UE-3 213, UE-4 214, UE-5 215, UE-6 216, and UE-7 217 may receive data and control information transmitted by UE-1 211.

Unlike LTE V2X, NR V2X may consider supporting a vehicle terminal to transmit data to only one specific node through the unicast and to transmit data to a plurality of specific nodes through the groupcast. For example, the unicast and groupcast techniques may be useful in a service scenario such as platooning which connects two or more vehicles via one network and drives them together. For example, a leader node of a group connected for the platooning may require the unicast communication to control one particular node, or the groupcast communication may be needed to simultaneously control a group including a plurality of specific nodes.

Figure 3:
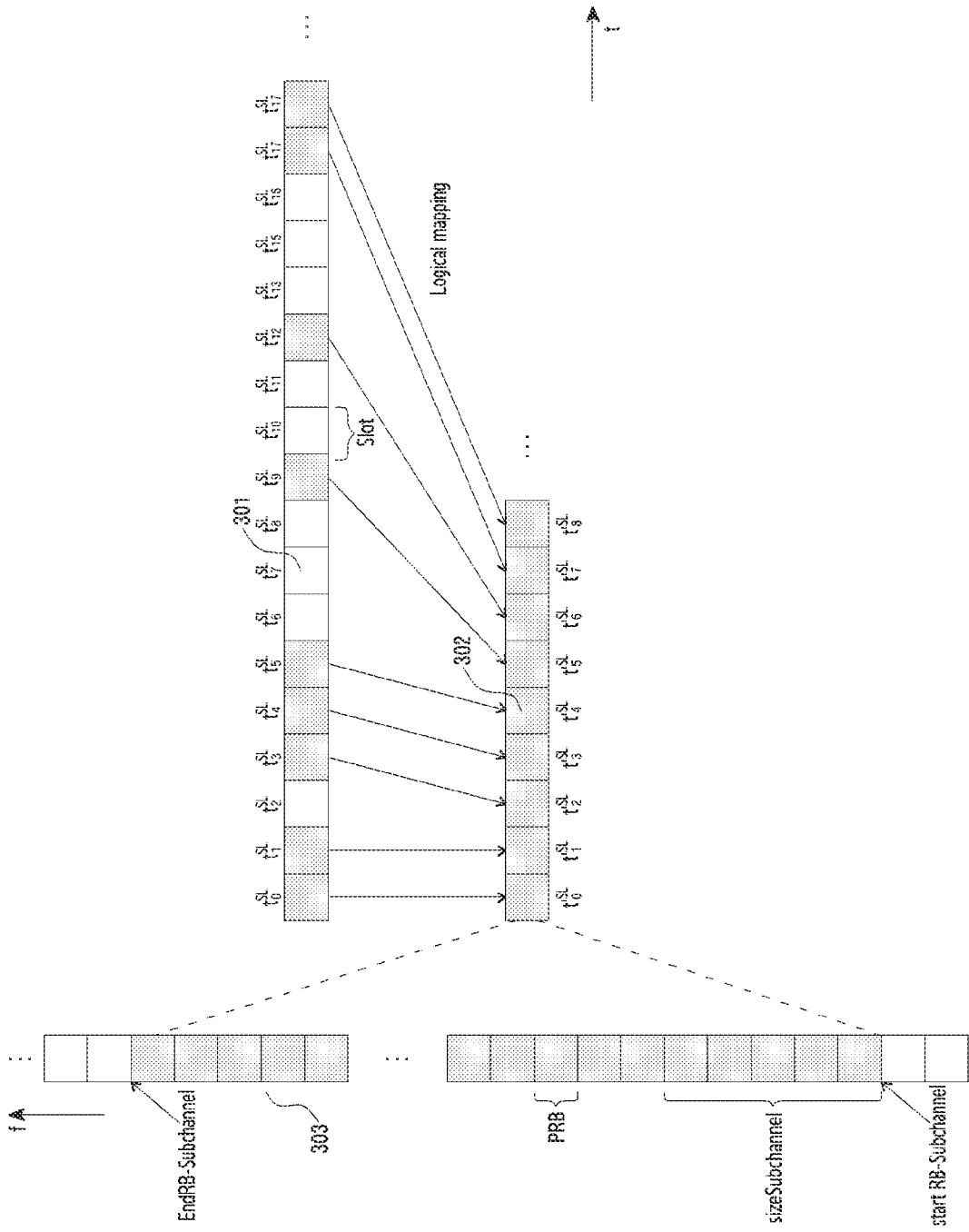
FIG. 3 illustrates a resource pool defined as a set of resources on time and frequency, used for SL transmission and reception according to an embodiment.

FIG. 3 illustrates a resource pool defined as a set of resources on time and frequency, used for SL transmission and reception according to an embodiment.

In the resource pool, resource granularity of the time axis may be a slot, resource granularity of the frequency axis may be a sub-channel including one or more physical resource blocks (PRBs). The disclosure is directed to when the resource pool is discontinuously allocated on the time axis, but the resource pool may be continuously allocated on the time axis. In addition, the disclosure is directed to when the resource pool is continuously allocated on the frequency, but a method of discontinuously allocating the resource pool on the frequency is not excluded.

Referring to FIG. 3, a resource pool 301 is discontinuously allocated on the time axis. The resource granularity on the time is the slot. SL slots may be defined within slots used for the UL. Specifically, the length of symbols used for the SL in one slot may be configured as SL BWP information. Hence, slots not guaranteeing the symbol length configured as the SL among the slots used for the UL may not serve as the SL slots. Slots transmitting an SL synchronization signal block (S-SSB) may be excluded from the slots of the resource pool. In the resource pool 301 discontinuously allocated on the time axis, a set of slots available for the SL on the time axis except for the slots transmitting the S-SSB is represented as $t_0^{SL}, t_1^{SL}, t_2^{SL}, \ldots$. In the resource pool 301 discontinuously allocated on the time axis, shaded portions represent SL slots of the resource pool. The SL slots of the resource pool may be (pre-)configured as resource pool information through a bitmap. In an SL slot set 302 of the resource pool on the time axis, a set of SL slots of the resource pool on the time axis is represented as $t'^{SL}_0$, $t'^{SL}_1$, $t'^{SL}_2$, . . . .

Herein, the (pre-)configuration may indicate configuration information which is pre-configured and pre-stored in the UE, or may indicate that the UE is configured from the base station in a cell-common manner. Herein, cell-common may indicate that UEs in a cell receive the same information configuration from the base station. A method in which the terminal obtains cell-common information by receiving the SL-SIB from the base station may be considered.

In addition, the (pre-)configuration may indicate that the UE is configured in a UE-specific manner after an RRC connection is established with the base station. Herein, UE-specific may be replaced with UE-dedicated and may indicate that each UE receives the configuration information with a particular value. A method in which the UE receives an RRC message from the base station and obtains UE-specific information may be considered. Further, a method of configuring (pre-)configuration as resource pool information and a method of configuring no (pre-)configuration in resource pool information may be considered. In case that the resource pool information is (pre-)configured, all UEs operating in a resource pool corresponding to the resource pool information may operate based on common configuration information, except for the UE configured in the UE-specific manner after the RRC connection with the base station is established.

The method of performing no (pre-)configuration in the resource pool information may be independent from the resource pool configuration information. For example, one or more modes (e.g., A, B, and C) may be (pre-)configured in a resource pool, and the information (pre-)configured independently of the resource pool configuration information may indicate which one (e.g., A, B, or C) of the (pre-)configured modes in the resource pool is used. In addition, the (pre-)configuration may be performed through the PC5-RC in the SL unicast transmission. By contrast, the (pre-)configuration may be performed through the MAC-CE. Herein, the (pre-)configuration indicates that all the cases may be applied.

Referring to a resource pool 303 continuously allocated on the frequency axis (or, frequency) in of FIG. 3, the resource pool is continuously allocated on the frequency axis (or, frequency). Resource allocation in the frequency axis may be configured as SL BWP information, and may be performed based on the sub-channel, which is defined as a resource granularity on the frequency axis, including one or more PRBs. That is, the sub-channel may be defined as an integer multiple of the PRB. In the resource pool 303 continuously allocated on the frequency axis, the sub-channel may include five consecutive PRBs, and a sub-channel size sizeSubchannel may be the size of the five consecutive PRBs. However, the configuration illustrated in FIG. 3 is merely an example, and the sub-channel size may differ from the sub-channel size shown in FIG. 3. In addition, one sub-channel generally includes, but is not limited to, consecutive PRBs, and may include discontinuous PRBs. The sub-channel may be the resource granularity for the PSSCH. In the resource pool 303 continuously allocated on the frequency axis, startRB-subchannel may indicate a start position of the sub-channel on the frequency axis in the resource pool. If the resource allocation on the frequency axis is performed based on the sub-channel, resources on the frequency axis may be allocated through configuration information of an RB index startRB-subchannel at which the sub-channel starts, information sizeSubchannel of the number of PRBs in the sub-channel, and/or the total number of sub-channels numSubchannel. In this case, the information of startRB-Subchannel, sizeSubchannel, and/or numSubchannel may be (pre-)configured as the frequency axis resource pool information.

Methods for allocating transmission resources in the SL include allocating an SL transmission resource from the base station if the UE is in base station coverage. Hereinafter, this method is referred to as Mode 1. In other words, Mode 1 may indicate that the base station allocates resources used for the SL transmission to RRC connected UEs in a dedicated scheduling manner. Since the base station may manage the SL resources, the method of Mode 1 may be effective in interference management and resource pool management. By contrast, the methods for allocating the transmission resources in the SL include a method for the UE to directly allocate the transmission resource in the SL through sensing. Hereinafter, this method is referred to as Mode 2. Mode 2 may be referred to as UE autonomous resource selection. Unlike Mode 1 in which the base station is directly involved in the resource allocation, the Tx UE autonomously selects the resource through sensing and resource selection procedures defined based on the (pre-)configured resource pool, and transmits data through the selected resource in Mode 2. If the transmission resource is allocated in Mode 1 or Mode 2, the UE may transmit and/or receive data and control information via the SL. The control information may include SL control information (SCI) format 1-A as $1^{st}$ stage SCI transmitted over a physical SL control channel (PSCCH). The control information may also include at least one of SCI format 2-A or SCI format 2-B as $2^{nd}$ stage SCI transmitted over the PSSCH.

A method using a PRS transmitted as positioning for measuring a location of the UE via the DL and the UL of the UE and the base station is now described and is referred to as radio access technology (RAT) dependent positioning. Another positioning method may be classified into RAT-independent positioning. Specifically, as the RAT-dependent positioning schemes, the LTE system may use methods such as observed time difference of arrival (OTDOA), uplink time difference of arrival (UTDOA), and enhanced cell identification (E-CID). The NR system may use methods such as downlink time difference of arrival (DL-TDOA), downlink angle-of-departure (DL-AOD), multi-RTT, NR E-CID, UL-TDOA, and UL-AOA. By contrast, the RAT-independent positioning may include methods such as assisted global navigation satellite systems (A-GNSS), sensor, wireless local area network (WLAN), and Bluetooth™.

The disclosure focuses on the RAT-dependent positioning methods supported via the SL. In the interface (e.g., the UL and the DL, hereinafter referred to as the Uu) between the base station and the UEs, the RAT-dependent positioning may be available only if the UE is within the coverage of the base station. However, the SL RAT-dependent positioning may not be limited to the in-coverage of the UE. The RAT-dependent positioning of the Uu may use positioning protocols such as LTE positioning protocol (LPP), LTE positioning protocol annex (LPPa) and NR positioning protocol annex (NRPPa). The LPP may be considered as the positioning protocol defined between the UE and the LS, and the LPPa and the NRPPa may be considered as the protocols defined between the base station and the LS. Herein, the LS manages the location measurement, may serve as a location management function (LMF), and may be referred to as the LMF or other name. Both of the LTE system and the NR system support the LPP, and the roles that may be performed for the positioning through the LPP include positioning capability exchange, assistance data transmission, location information transmission, error handling, and abort.

The UE and the LS perform the above roles through the LPP, and the base station may enable the UE and the LS to exchange the positioning information through the LPP without base station involvement. That is, exchanging the positioning information through the LPP may be transparent to the base station.

In the positioning capability exchange, the UE may exchange supportable positioning information with the LS. For example, the positioning information supported by the UE may indicate whether the UE is UE-assisted, UE-based, or both. The UE-assisted method indicates that the UE transmits only a measured value of the positioning scheme to the LS based on a received positioning signal, without directly measuring the absolute position of the UE, according to the positioning method applied to the UE, and the LS calculates the absolute position of the UE. The absolute position may indicate two-dimensional (x, y) and three-dimensional (x, y, z) coordinate position information of the UE based on longitude and latitude. By contrast, in UE-based positioning, the UE may directly measure the absolute position of the UE, for which the UE needs to receive the positioning signal, together with position information of the entity which transmits the positioning signal.

While the LTE system supports only UE-assisted positioning, the NR system may support both UE-assisted positioning and UE-based positioning. The assistance data transmission may be a significantly important factor in the positioning, to accurately measure the location of the terminal. Specifically, in the assistance data transmission, the LS may provide the UE with positioning signal configuration information, information of candidate cells and transmission reception points (TRPs) to receive the positioning signal, and the like. For example, if the DL-TDOA is used, the information of the candidate cells and the TRPs to receive the positioning signal may be reference cell, reference TRP, neighbor cell, and neighbor TRP information. In addition, a plurality of candidates for the neighbor cells and the neighbor TRPs may be provided, and information of a cell and a TRP to be selected by the UE to measure the positioning signal may be provided together. To accurately measure the location, the UE may need to properly select reference candidate cell and TRP information. For example, if a channel of a positioning signal received from corresponding candidate cell and TRP is a line-of-sight (LOS) channel, that is, a channel having fewer non-LOS (NLOS) channel components, the accuracy of the positioning measurement may increase. Hence, if the LS provides the UE with the reference candidate cell and TRP information to perform the positioning by collecting various information, the UE may perform more accurate positioning measurement.

The location information transmission may be performed through the LPP. The LS may request location information from the UE, and the UE may provide measured location information to the LS in response to the request. In UE-assisted positioning, the corresponding location information may be a measured value with respect to the positioning scheme based on the received positioning signal. By contrast, in UE-based positioning, the corresponding location information may be two-dimensional (x, y) and three-dimensional (x, y, z) coordinate position values of the UE. If requesting the location information from the UE, the LS may include required accuracy and response time in positioning quality-of-service (QoS) information. Upon the request including the positioning QoS information, the UE may need to provide the LS with the measured location information to satisfy the accuracy and response time, and, in case that the QoS cannot be satisfied, the UE may consider the error handling and the abort. (That is, in case that the QoS corresponding to the accuracy and the response time cannot be satisfied, the UE may determine to handle the error and abort transmitting the location information.) However, this is merely an example, and the error handling and the abort may be performed on the positioning in other cases than when the QoS cannot be satisfied.

The positioning protocol defined between the base station and the LS is referred to as the LPP in the LTE system, and E-CID location information transmission, OTDOA information transmission, general error state reporting, and assistance information transmission may be performed between the base station and the LS.

The positioning protocol defined between the base station and the LS is referred to as the NRPPa in the NR system, and positioning information transmission, measurement information transmission, and TRP information transmission may be additionally performed between the base station and the LS, including the roles performed by the LPPa.

The NR system supports more positioning schemes than the LTE system. Hence, various positioning schemes may be supported through the positioning information transmission. For example, the base station may perform the positioning measurement through an SRS transmitted by the UE. Thus, information related to positioning SRS configuration and/or activation/deactivation may be exchanged as the positioning information between the base station and the LS. The measurement information transmission indicates exchanging information of the multi-RTT, the UL-TDOA, and the UL-AOA not supported in the LTE system, between the base station and the LS. Since the LTE system may perform the positioning based on the cell but the NR system may perform the positioning based on the TRP, the TRP information transmission may exchange information related to performing the TRP-based positioning.

The entity for performing the positioning related configuration and for calculating the positioning to measure the location of the UE in the SL may be classified into the UE with no LS, LS through the BS, and LS through the UE.

The LS denotes the location server, the BS denotes the base station such as gNB or eNB, and the UE denotes a terminal performing transmission and reception via the SL. The terminal performing the transmission and the reception via the SL may be a vehicle terminal or a pedestrian terminal and may include an RSU having terminal functionality, an RSU having base station functionality, or an RSU having a part of base station functionality and a part of terminal functionality. In addition, the terminal performing the transmission and the reception via the SL may include a positioning reference unit (PRU) to which the location of the terminal is known. The UE (no LS) indicates an SL UE not connected to the LS. The LS (through BS) indicates an LS, which is connected to the base station. By contrast, the LS (through UE) indicates an LS, which is connected to the SL UE. In other words, the LS (through UE) may indicate that the LS is available even if the UE is not in the base station coverage area. The LS (through UE) may be available only to a specific terminal such as the RSU or the PRU, other than a general terminal. A UE connected to the LS via the SL may be defined as a new type of device. Only a particular UE supporting UE capability connected to the LS may perform a function of connecting to the LS via the SL.

In Table 1 below, Case 1 through Case 9 show various combinations of the entity which performs the positioning related configuration and the entity which calculates the positioning to measure the location of the UE on the SL. A UE to be measured for its location is referred to as a target UE, and a UE of which the location is known, or which provides the positioning signal for the location measurement of the target UE is referred to as a positioning reference (PosRef) UE. Accordingly, the PosRef UE may have its location information and may provide the UE location information together with the SL-PRS.

That is, the PosRef UE may be a UE having the known location. The names of the target UE and the PosRef UE may be replaced with other terms. For example, the PosRef UE may also be referred to as an anchor UE. The positioning configuration may be classified into a UE-configured scheme and a network-configured scheme. In Table 1, if the positioning configuration is UE (no LS), the positioning configuration may correspond to the UE-configured scheme. The UE-configured scheme allows the positioning configuration even if the UE is not in the network (base station) coverage. In Table 1, if the positioning configuration is LS (through BS), the positioning configuration may correspond to the UE-configured scheme. In the network-configured scheme, the UE is in the network coverage, positioning calculation and measurement information is reported to the base station and the LS connected to the base station performs the location measurement of the target UE. Thus, a delay may occur due to the signaling related to the location measurement but more accurate location measurement may be possible. In Table 1, if the positioning configuration is LS (through UE), it may not be classified into the network-configured scheme because the UE is not configured in the network coverage through the base station. In addition, in case that the LS connected to the UE provides the configuration but is not classified as the UE configuration, the position configuration scheme may not be classified into the UE-configured scheme. However, in case that the UE performs the configuration, the positioning configuration scheme may be classified into the UE-configured scheme. Thus, in the case of LS (through UE), the positioning configuration scheme may be referred to as another scheme than the UE-configured or network-configured scheme.

The positioning calculation may be classified into UE-assisted and UE-based schemes as described above. In Table 1, the positioning calculation UE (no LS) may correspond to the UE-based scheme, and the positioning calculation LS (through BS) or LS (through UE) may generally correspond to the UE-assisted scheme. However, when the positioning calculation is LS (through UE) and the LS is interpreted as the UE, LS (through UE) may be classified into the UE-based scheme.

TABLE 1

| | Positioning configuration | Positioning calculation |
|---|---|---|
| case 1 | UE (no LS) | UE (no LS) |
| case 2 | UE (no LS) | LS (through BS) |
| case 3 | UE (no LS) | LS (through UE) |
| case 4 | LS (through BS) | UE (no LS) |
| case 5 | LS (through BS) | LS (through BS) |
| case 6 | LS (through BS) | LS (through UE) |
| case 7 | LS (through UE) | UE (no LS) |
| case 8 | LS (through UE) | LS (through BS) |
| case 9 | LS (through UE) | LS (through UE) |

In Table 1, the positioning configuration information may include SL-PRS configuration information which may be SL-PRS pattern information and information related to a time/frequency transmission location. In addition, the positioning calculation in Table 1 may be performed by the UE receiving the SL-PRS and performing the measurement from the received SL-PRS, and the positioning measurement and calculation method may vary depending on which positioning method is applied. The location information measurement in the SL may be the absolute positioning to provide two-dimensional (x, y) and three-dimensional (x, y, z) coordinate position values of the UE, and may be the relative positioning to provide relative two-dimensional or three-dimensional position information from another terminal. In addition, the location information in the SL may be ranging information including one of the distance or the direction from another terminal. If the ranging in the SL includes both the distance information and the direction information, ranging may have the same meaning as the relative positioning. The positioning method may consider methods such as SL-TDOA, SL-AOD, SL multi-RTT, SL RTT, SL E-CID, and SL angle-of-arrival (AOA).

Figure 4:
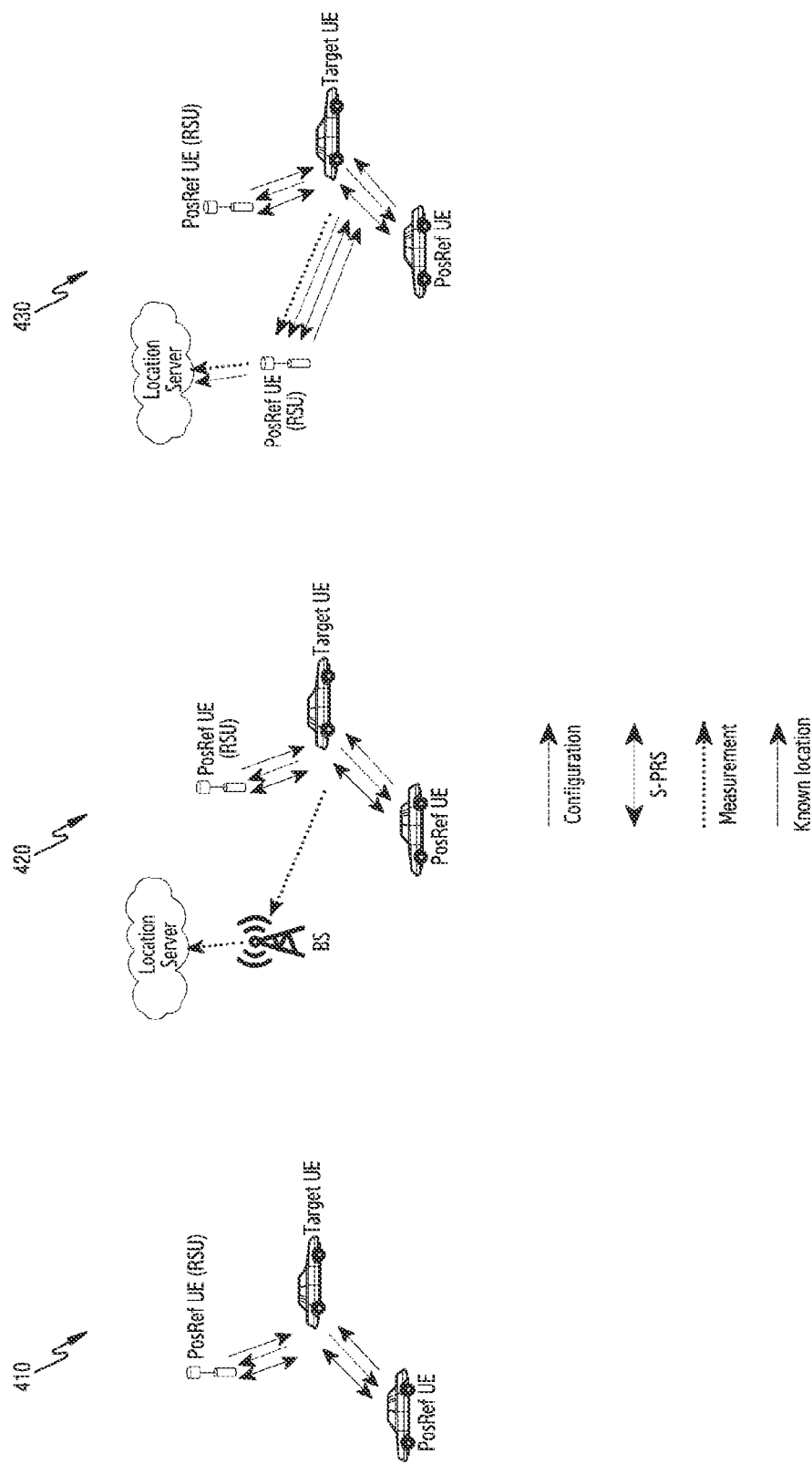
FIG. 4 illustrates calculating a location of a terminal via an SL according to an embodiment.

FIG. 4 illustrates calculating a UE location via an SL according to an embodiment.

Calculating the UE location via the SL is not limited to the examples in the disclosure. Signaling of positioning configuration information is marked with a dashed line. The SL-PRS transmission is marked with a solid line and may be performed in two directions or one direction. Transmission of information measured for the positioning or the measured positioning information is marked with a dotted line. Transmission of a known location of the UE is marked with a dash-dotted line.

Referring to FIG. 4, in case 410, an SL UE not connected to the LS provides positioning configuration and a target UE not connected to the LS performs the positioning calculation. The case 410 in which the SL UE not connected to the LS provides the positioning configuration and the target UE not connected to the LS performs the positioning calculation may correspond to Case 1 of Table 1. In this case, the target UE may broadcast, unicast, and/or groupcast indication of the positioning related configuration information to another UE via the SL. The target UE may perform the positioning calculation based on the received positioning signal.

Referring to FIG. 4, in case 420, the SL UE not connected to the LS provides the positioning configuration, the target UE is in network coverage and the LS connected to a base station performs the positioning calculation. The case 420 in which the SL UE not connected to the LS provides the positioning configuration, the target UE is in the network coverage and the LS connected to the base station performs the positioning calculation may correspond to Case 2 of Table 1. In this case, the target UE may broadcast, unicast, and/or groupcast the indication of the positioning related configuration information to another UE via the SL. The target UE may perform the positioning calculation based on the received positioning signal, and the target UE, which is in the base station coverage, may report the measured positioning information to the base station. As the measured positioning information is reported to the base station, the corresponding measured information may be reported to the LS connected with the base station and the LS may perform the positioning calculation.

Referring to FIG. 4, in case 430, the SL UE not connected to the LS provides the positioning configuration and the LS performs the positioning calculation via the SL UE connected to the LS. The case 430 in which the SL UE not connected to the LS provides the positioning configuration and the LS performs the positioning calculation via the SL UE connected to the LS may correspond to Case 3 of Table 1. In this case, the target UE may broadcast, unicast, and/or groupcast the indication of the positioning related configuration information to another UE via the SL. The target UE may perform the positioning calculation based on the received positioning signal, and the target UE, which is in SL coverage of the UE connected to the LS, may report the measured positioning information to the UE connected to the LS. In the case 430 in which the SL UE not connected to the LS provides the positioning configuration and the LS performs the positioning calculation via the SL UE connected to the LS, the UE connected to the LS is depicted as a PosRef UE (RSU), but this is merely an example. The UE connected to the LS may be a UE rather than the RSU. The corresponding measurement information may be reported to the LS connected with the PosRef UE (the RSU) and the LS may perform the positioning calculation.

Figure 5:
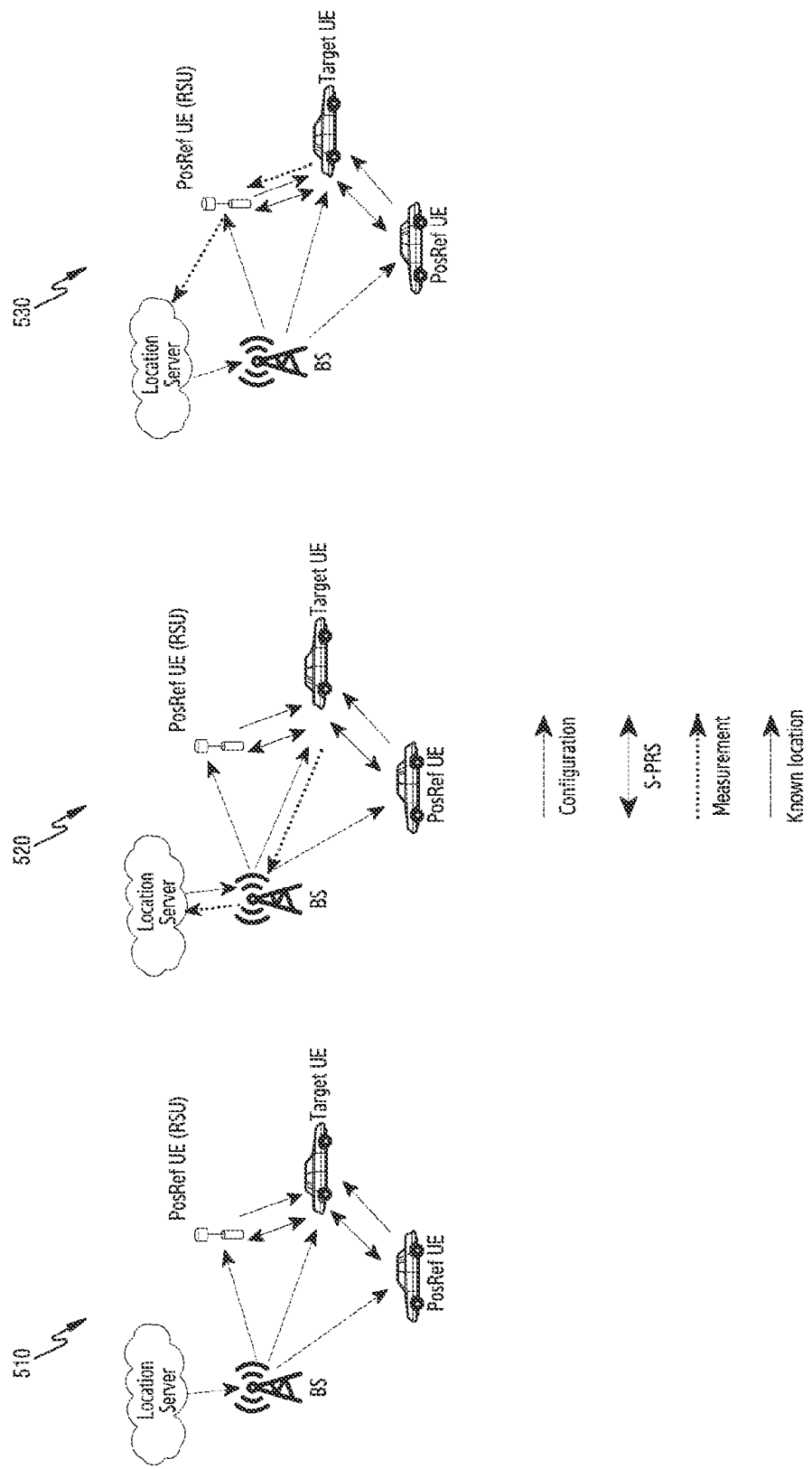
FIG. 5 illustrates calculating a location of a terminal via an SL according to an embodiment.

FIG. 5 illustrates calculating a UE location via an SL according to an embodiment.

Referring to FIG. 5, in case 510, an SL UE is in network coverage, an LS connected with a base station provides positioning configuration and a target UE not connected to the LS performs positioning calculation. The case 510 in which the SL UE is in the network coverage, the LS connected with the base station provides the positioning configuration and the target UE not connected to the LS performs the positioning calculation may correspond to Case 4 of Table 1. In this case, the LS connected with the base station may provide the positioning configuration information using the positioning protocol such as LPP. The target UE may perform the positioning calculation based on the received configuration information and the positioning signal.

Referring to FIG. 5, in case 520, the SL UE is in the network coverage, the LS connected with the base station provides the positioning configuration, the target UE is in the network coverage, and the LS connected with the base station performs the positioning calculation. The case 520 in which the SL UE is in the network coverage, the LS connected with the base station provides the positioning configuration, the target UE is in the network coverage, and the LS connected with the base station performs the positioning calculation may correspond to Case 5 of Table 1. In this case, the LS connected with the base station may provide the positioning configuration information using the positioning protocol such as LPP. The target UE may perform the positioning measurement based on the received configuration information and the positioning signal, and the target UE, which is in the base station coverage, may report the measured positioning information to the base station. As the measured positioning information is reported to the base station, the reported measurement information (or, the measured positioning information) may be reported to the LS connected with the base station and the LS may perform the positioning calculation.

Referring to FIG. 5, in case 530, the SL UE is in the network coverage, the LS connected with the base station provides the positioning configuration, and the LS performs the positioning calculation via the SL UE connected to the LS. The case 530 in which the SL UE is in the network coverage, the LS connected with the base station provides the positioning configuration, and the LS performs the positioning calculation via the SL UE connected to the LS may correspond to Case 6 of Table 1. In this case, the LS connected with the base station may provide the positioning configuration information using the positioning protocol such as LPP. The target UE may perform the positioning measurement based on the received configuration information and the positioning signal, and the target UE, which is in the SL coverage of the UE connected to the LS, may report the measured positioning information to the UE connected to the base station. In the case 530 in which the SL UE of FIG. 5 is in the network coverage, the LS connected with the base station provides the positioning configuration, and the LS performs the positioning calculation via the SL UE connected to the LS, the UE connected to the LS is depicted as the PosRef UE (the RSU), but this is merely an example. The UE connected to the LS may be a UE rather than the RSU. The measurement information may be reported to the LS connected with the PosRef UE (the RSU) and the LS may perform the positioning calculation.

Figure 6:
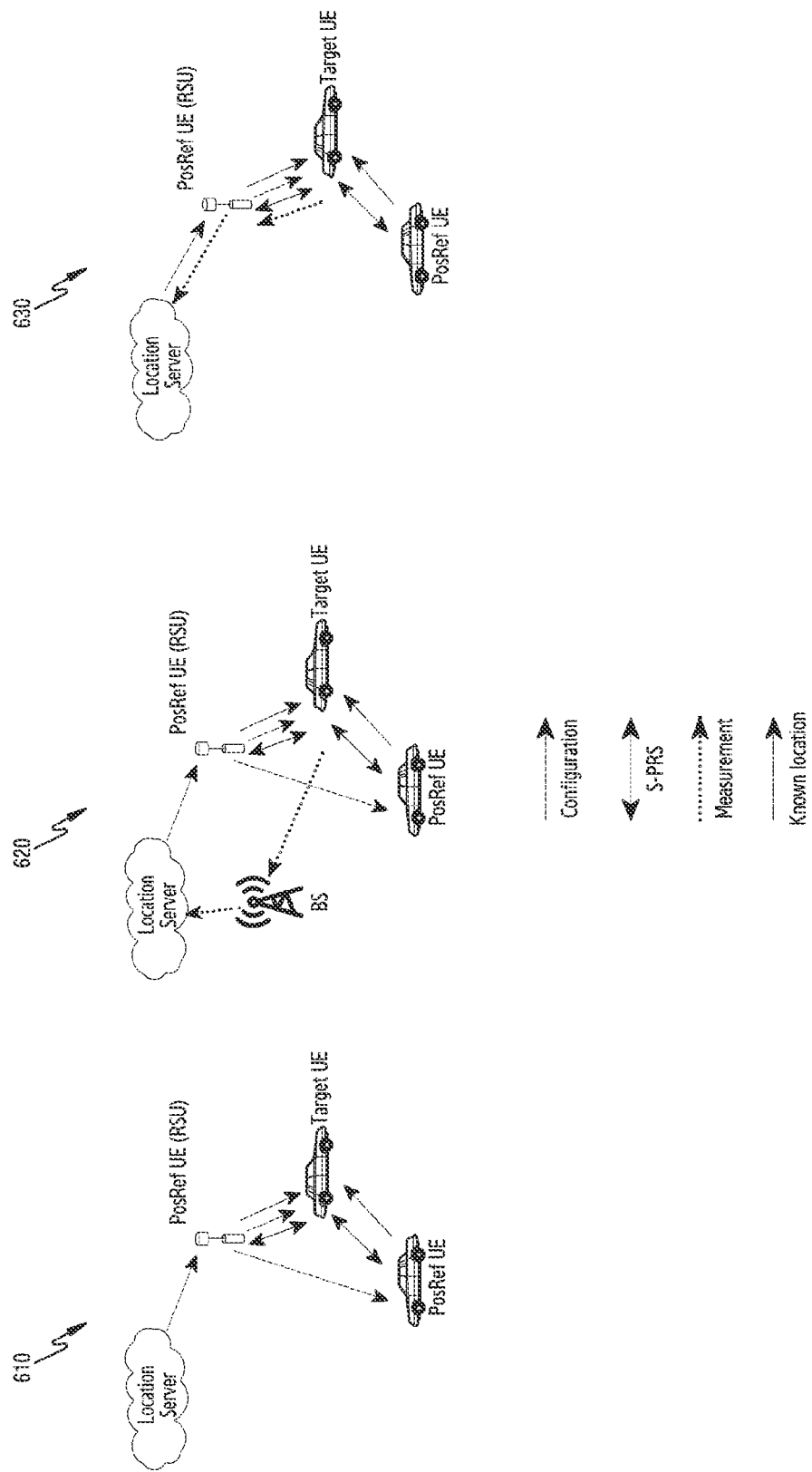
FIG. 6 illustrates calculating a location of a terminal via an SL according to an embodiment.

FIG. 6 illustrates calculating a UE location via an SL according to an embodiment.

Referring to FIG. 6, an example 610 illustrates that an LS provides positioning configuration via an SL UE connected to the LS and a target UE not connected to the LS performs the positioning calculation.

The case 610 in which the LS provides the positioning configuration via the SL UE connected to the LS and the target UE not connected to the LS performs the positioning calculation may correspond to Case 7 of Table 1. The positioning protocol such as LPP may be used for the LS connected with the UE to provide the positioning configuration information. The target UE may perform the positioning calculation based on the received configuration information and a positioning signal.

Referring to FIG. 6, in case 620, the LS provides the positioning configuration via the SL UE connected to the LS, the target UE is in network coverage, and the LS connected with the base station performs the positioning calculation. The case 620 in which the LS provides the positioning configuration via the SL UE connected to the LS, the target UE is in the network coverage, and the LS connected with the base station performs the positioning calculation may correspond to Case 8 of Table 1. The positioning protocol such as LPP may be used for the LS connected with the UE to provide the positioning configuration information. The target UE may perform the positioning measurement based on the received configuration information and the positioning signal, and the target UE, which is in the base station coverage, may report the measured positioning information to the base station. As the measured positioning information is reported to the base station, the measurement information (or, positioning information) may be reported to the LS connected with the base station and the LS may perform the positioning calculation.

Referring to FIG. 6, in case 630, the LS provides the positioning configuration via the SL UE connected to the LS, and the LS performs the positioning calculation via the SL UE connected to the LS. The case 630 in which the LS provides the positioning configuration via the SL UE connected to the LS, and the LS performs the positioning calculation via the SL UE connected to the LS may correspond to Case 9 of Table 1. The positioning protocol such as LPP may be used for the LS connected with the UE to provide the positioning configuration information. The target UE may perform the positioning measurement based on the received configuration information and the positioning signal, and the target UE, which is in the SL coverage of the UE connected to the LS, may report the measured positioning information to the UE connected to the base station. In the case 630 in which the LS provides the positioning configuration via the SL UE connected to the LS, and the LS performs the positioning calculation via the SL UE connected to the LS, the UE connected to the LS is depicted as the PosRef UE (the RSU), but this is merely an example. The UE connected to the LS may be a UE rather than the RSU. The measurement information may be reported to the LS connected with the PosRef UE (the RSU) and the LS may perform the positioning calculation.

The following embodiment describes a method for performing the RTT using the S-PRS transmitted via the SL.

Figure 7:
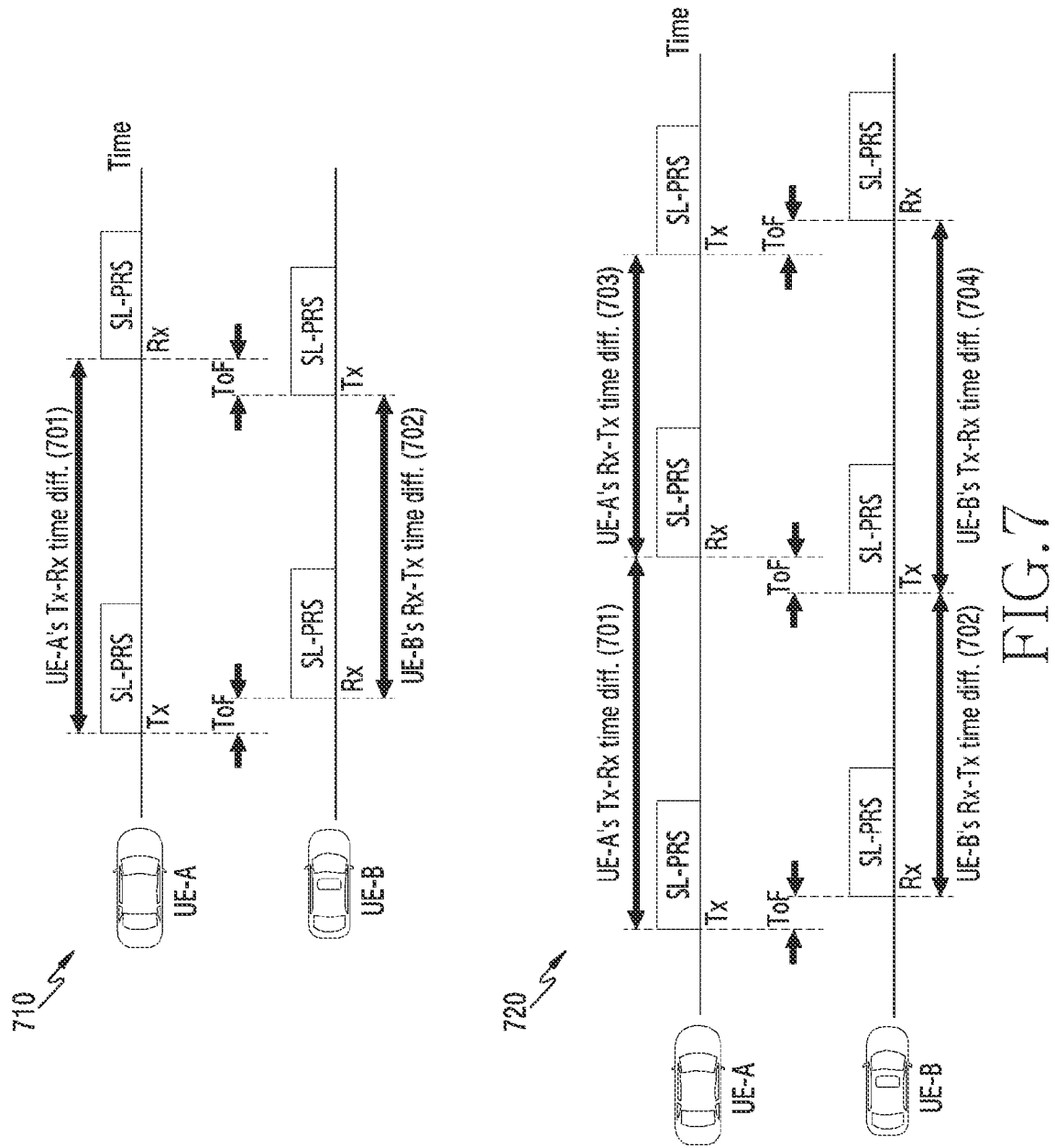
FIG. 7 illustrates positioning using a round trip time (RTT) scheme according to an embodiment.

FIG. 7 illustrates positioning using an RTT scheme according to an embodiment.

Referring to FIG. 7, UE-A and UE-B may correspond to a target UE and a PosRef UE respectively. FIG. 7 illustrates that UE-A and UE-B correspond to the target UE and the PosRef UE respectively, but this is merely an example. That is, UE-A may correspond to the PosRef UE, and UE-B may correspond to the target UE. In FIG. 7, the target UE performs the e.g., single RTT in one pair with one PosRef UE but this is also an example, and the target UE may perform the RTT with a plurality of PosRef UEs. In this case, the target UE may have a plurality of pairs with one PosRef UE, which may be referred to as multi-RTT and may be required for the absolute positioning. Using the RTT, time of flight (ToF) may be calculated and a distance may be calculated using an Equation (1), Equation (2) or Equation (3) as follows.

$$\text{speed} = \text{time}/\text{distance} \quad (1)$$

$$\text{distance} = \text{speed} \times \text{time} \quad (2)$$

$$\text{time} = \text{distance}/\text{speed} \quad (3)$$

Herein, the ToF indicates the time axis and the speed may adopt the speed of light.

Referring to FIG. 7, a single sided RTT method 710 is shown. According to the single sided RTT 710, UE-A transmits a positioning signal to UE-B and UE-B transmits a positioning signal to UE-A, to perform the RTT measurement. For example, UE-A may calculate a time difference $T_{round}$ 701 between transmitting the positioning signal to UE-B and receiving the positioning signal from UE-B. UE-B may calculate a time difference $T_{reply}$ 702 between receiving the positioning signal from UE-A and transmitting the positioning signal to UE-A. The ToF may be calculated based on Equation (4) as follows.

$$\text{ToF} = 1 - 2(T_{round} - T_{reply}) \quad (4)$$

When calculating Equation (4) at UE-A, $T_{reply}$ information calculated at UE-B may need to be indicated to UE-A. By contrast, to calculate Equation (4) at UE-B, $T_{round}$ information calculated at UE-A may need to be indicated to UE-B. The $T_{round}$ information indication calculated at UE-A shall be described below.

A double sided RTT method 720 is shown in FIG. 7. According to the double sided RTT 720, UE-A transmits a positioning signal to UE-B, UE-B transmits a positioning signal to UE-A, and UE-A transmits a positioning signal back to UE-B, to perform the RTT measurement. For example, UE-A may calculate a time difference $T_{round1}$ 701 between transmitting the positioning signal to UE-B and receiving the positioning signal from UE-B. UE-B may calculate a time difference $T_{reply1}$ 702 between receiving the positioning signal from UE-A and transmitting the positioning signal to UE-A. UE-A may calculate a time difference $T_{reply2}$ 703 between receiving the positioning signal from UE-B and transmitting the second positioning signal to UE-B. UE-B may calculate a time difference $T_{round2}$ 704 between transmitting the positioning signal to UE-A and receiving the second positioning signal from UE-A. Hence, the ToF may be calculated based on Equation (5) as follows.

$$\text{ToF} = (T_{round1} \times T_{round2} - T_{reply1} \times T_{reply2})/(T_{round1} + T_{round2} + T_{reply1} + T_{reply2}) \quad (5)$$

To calculate Equation (5) at UE-A, $T_{reply1}$ and $T_{round2}$ information calculated at UE-B may need to be indicated to UE-A. By contrast, to calculate Equation (5) at UE-B, $T_{round1}$ and $T_{reply2}$ information calculated at UE-A may need to be indicated to UE-B. The $T_{round1}$ and $T_{reply2}$ information indication calculated at UE-A shall be described below in relation to the fifth embodiment. Compared with the single sided RTT based on Equation 1(4), the double sided RTT based on Equation (5) may improve the positioning accuracy by minimizing a clock drift effect of each UE. However, the double sided RTT based on Equation (5) may be subject to additional signal exchange and additional delay in the ToF calculation, compared to the single sided RTT based on Equation (4). The RTT method of the disclosure is not limited to the two methods mentioned above. That is, the ToF may be calculated by further calculating $T_{round}$ and $T_{reply}$ through additional positioning signal exchange after $T_{reply2}$ and $T_{round2}$.

The disclosure may use one or more of the following embodiments in combination. In the disclosure, the congestion control and power control methods in the positioning signal transmission is proposed.

In the first embodiment, a method allowing a UE to configure and transmit a signal for location measurement via an SL is disclosed.

Whether the UE may perform the positioning via the SL, that is, whether the UE is a UE capable of performing the positioning operation may be determined by UE capability. UE capability information may be transmitted to another terminal and the base station. Whether the UE may perform the positioning via the SL may be determined by whether an SL positioning signal is transmitted/received. The SL positioning signal may be the SL-PRS transmitted and/or received for the positioning measurement. For example, a specific SL UE may perform both the transmission and the reception of the SL-PRS.

A specific SL UE may perform the SL-PRS transmission but may not perform the SL-PRS reception. For example, a specific SL UE may perform the SL-PRS reception but may not perform the SL-PRS transmission. A specific SL UE may perform neither the transmission nor the reception of the SL-PRS. Whether the UE may transmit/receive the SL-PRS may be defined as the UE capability.

The disclosure does not limit the SL-PRS signal to a specific signal. For example, the SL-PRS signal may be an SL synchronization signal, and the SL-PRS signal may be another reference signal defined in the SL. the SL-PRS signal may be a new reference signal defined for the SL positioning.

Figure 8:
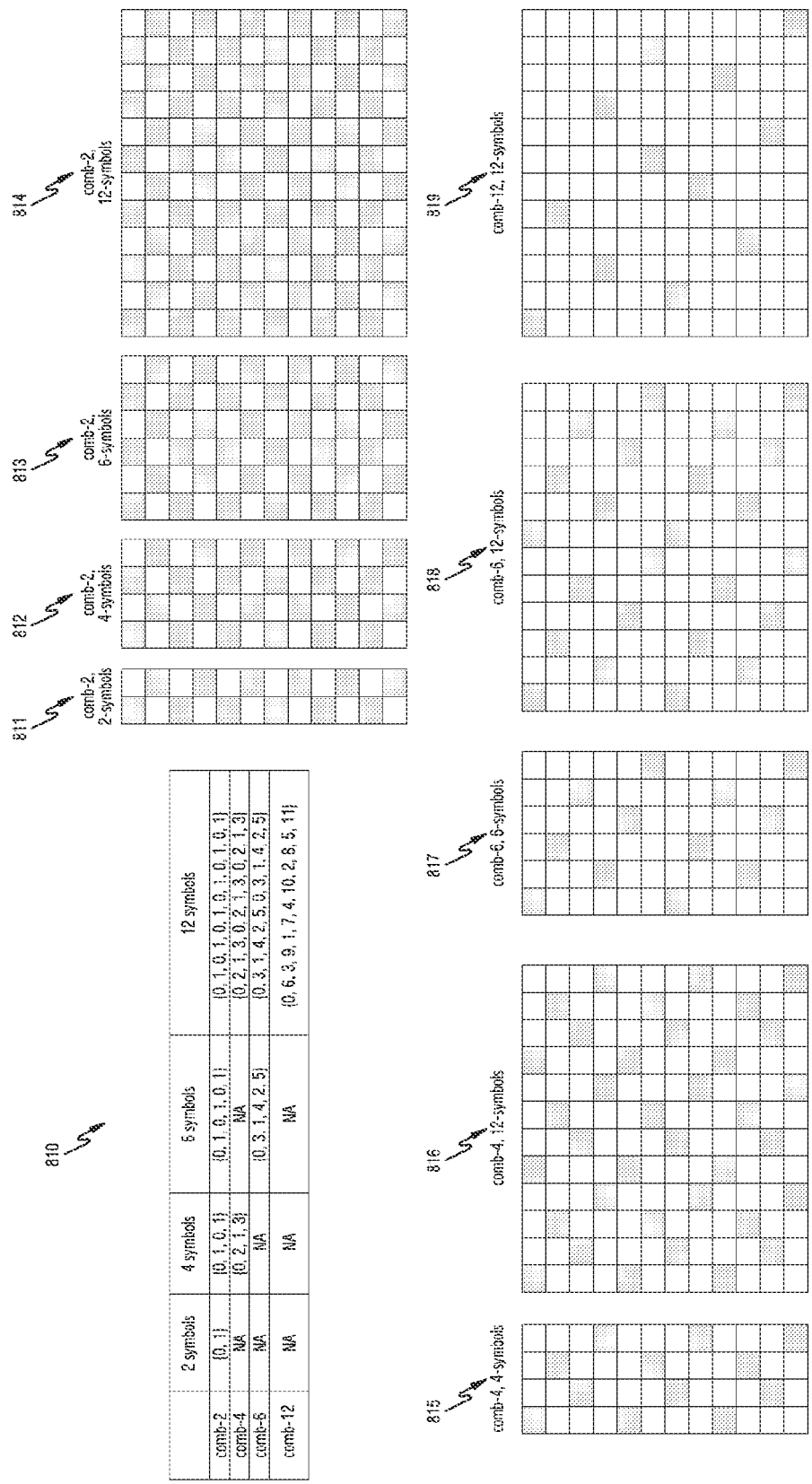
FIG. 8 illustrates patterns of an SL-PRS according to an embodiment.

FIG. 8 illustrates patterns of an SL-PRS according to an embodiment.

Figure 9:
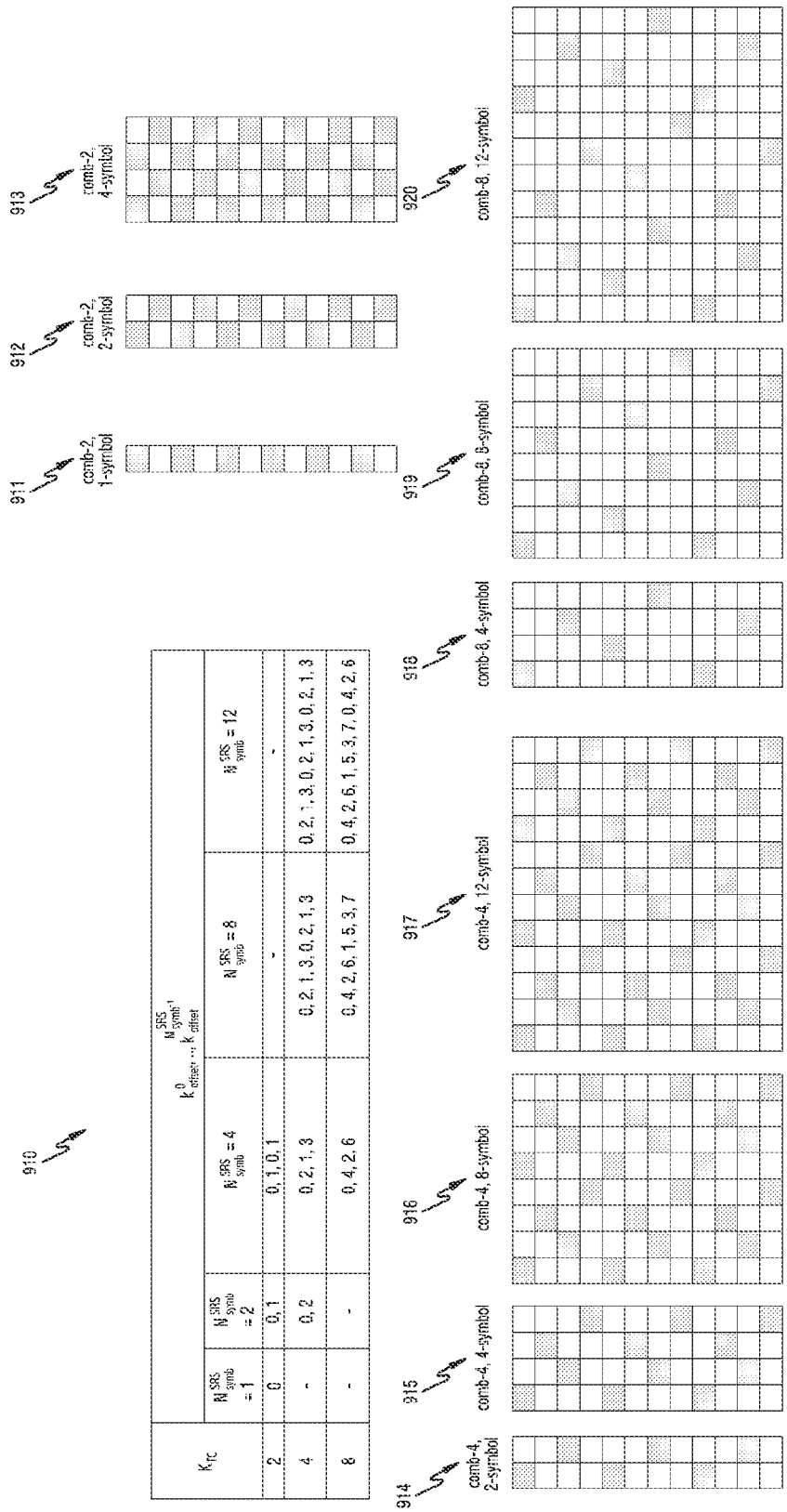
FIG. 9 illustrates patterns of an SL-PRS according to an embodiment.

The SL-PRS illustrated in FIG. 8 and FIG. 9 may not be FDMed and transmitted with other SL channels and signals. This is to avoid interference with the other channels and signals by transmitting only the SL-PRS in symbols carrying the SL-PRS. Thus, the positioning accuracy may be ensured.

Referring to FIG. 8, a method for reusing a pattern based on a DL PRS for the SL-PRS is illustrated. In a table 810 of FIG. 8, comb patterns and the number of PRS symbols supported in the DL PRS may be reused as the SL-PRS. For example, an SL-PRS pattern 811 for comb-2 and the number of PRS symbols=2 is shown. An SL-PRS pattern 812 for comb-2 and the number of PRS symbols=4 is shown. An SL-PRS pattern 813 for comb-2 and the number of PRS symbols=6 is shown. An SL-PRS pattern 814 for comb-2 and the number of PRS symbols=12 is shown. An SL-PRS pattern 815 for comb-4 and the number of PRS symbols=4 is shown. An SL-PRS pattern 816 for comb-4 and the number of PRS symbols=12 is shown. An SL-PRS pattern 817 for comb-6 and the number of PRS symbols=6 is shown. An SL-PRS pattern 818 for comb-6 and the number of PRS symbols=12 is shown. An SL-PRS pattern 819 for comb-12 and the number of PRS symbols=12 is shown. Referring to FIG. 8, the SL-PRS may have various symbol lengths, and a start position and the length of the symbols carrying the SL-PRS in the slot may be flexibly determined. The SL-PRS patterns are not limited to the patterns shown in FIG. 8.

FIG. 9 illustrates patterns of an SL-PRS according to an embodiment.

Referring to FIG. 9, a method for reusing a pattern based on a UL SRS for the SL-PRS is explained. In Table 910 of FIG. 9, comb patterns and the number of SRS symbols supported in the UL SRS for the positioning may be reused as the SL-PRS. For example, an SL-PRS pattern 911 for comb-2 and the number of PRS symbols=1 is shown. An SL-PRS pattern 912 for comb-2 and the number of PRS symbols=2 is shown. An SL-PRS pattern 913 for comb-2 and the number of PRS symbols=4 is shown. An SL-PRS pattern 914 for comb-4 and the number of PRS symbols=2 is shown. An SL-PRS pattern 915 for comb-4 and the number of PRS symbols=4 is shown. An SL-PRS pattern 916 for comb-4 and the number of PRS symbols=8 is shown. An SL-PRS pattern 917 for comb-4 and the number of PRS symbols=12 is shown. An SL-PRS pattern 918 for comb-8 and the number of PRS symbols=4 is shown. An SL-PRS pattern 919 for comb-8 and the number of PRS symbols=8 is shown. An SL-PRS pattern 920 for comb-8 and the number of PRS symbols=12 is shown. Referring to FIG. 9, the SL-PRS may have various symbol lengths, and the start position and the length of the symbols carrying the SL-PRS in the slot may be flexibly determined. The SL-PRS patterns are not limited to the patterns shown in FIG. 9 in the disclosure.

The positioning method supportable by the UE may be defined as UE capability. For example, the positioning may consider, but is not limited to, methods such as SL-TDOA, SL-AOD, SL multi-RTT, SL RTT, SL E-CID, and SL-AOA. The supportable SL positioning method may be determined by the UE capability, and corresponding capability information may be transmitted to another UE and the base station.

When the UE performs the positioning via the SL, related positioning configuration information may be (pre-)configured. For example, SL-PRS information may be (pre-)configured as the positioning related information. Activation/deactivation of the SL-PRS transmission may be (pre-)configured. If the SL-PRS transmission is deactivated, the UE, which receives the indication and/or the request to transmit the SL-PRS via the LS or other UE, may not perform the SL-PRS transmission. If SL-PRS transmission bandwidth (e.g., an allocation region on the frequency axis (or, frequency)) and period (e.g., an allocation region on the time axis (or, time)) may be configured variously, corresponding information may be (pre-)configured. For example, available comb patterns, the number of the PRS symbols and/or the position (e.g., the start symbol) transmitting the PRS in the slot may be (pre-)configured as described in FIG. 8 and FIG. 9. As another example, positioning method information may be (pre-)configured as the positioning related information. For example, an available positioning method may be (pre-)configured. The UE positioning method may include SL-TDOA, SL-AOD, SL Multi-RTT, SL RTT, SL E-CID, and SL-AOA. The supportable SL positioning method may be determined by the UE capability and the corresponding capability information may be transmitted to another UE and the base station. In addition, an available positioning method of the supportable SL positioning methods based on the UE capability may be (pre-)configured.

As described in Table 1, when the positioning configuration is not received from another UE or the LS, the UE may conform to the positioning configuration information pre-configured and pre-stored. The UE may follow the positioning configuration information pre-configured and pre-stored if the UE is outside the network coverage. The UE may follow the positioning configuration information pre-configured and pre-stored, if no positioning related configuration information is received from another UE. After a specific time, the UE may be configured to receive (or, configured with) the positioning information from another UE or the LS. If the positioning configuration of the UE corresponds to UE (no LS) or LS (through UE) of Table 1 and the positioning information is configured from another UE, the corresponding information may be broadcast, unicast, or groupcast via the SL. The corresponding information may be indicated through SCI (e.g., $1^{st}$ stage SCI or $2^{nd}$ stage SCI), PC5-RRC or SL MAC-CE. If the positioning configuration corresponds to LS (through UE) and the UE, which is connected to the LS, is configured the positioning information, the corresponding information may be indicated from an upper node of the UE. By contrast, if the positioning configuration of the UE corresponds to LS (through BS) of Table 1 and the UE is configured to receive (or, configured with) the positioning information from the LS connected with the BS, the corresponding information may be configured from the base station to the UE in the cell-common manner. Cell-common may indicate that UEs in a cell receive the same information configuration from the base station. The UE may consider a method of obtaining cell-common information by receiving an SL-SIB from the base station. If the positioning configuration of the UE corresponds to LS (through BS) of Table 1 and the UE is configured to receive (or, configured with) the positioning information from the LS connected with the BS, the corresponding information may be configured in UE-specific manner after the RRC connection is established with the base station.

As mentioned above, when the positioning configuration is not received from another UE or the LS, the UE may transmit or receive a positioning signal according to the positioning configuration information pre-configured and pre-stored. After a specific time, the UE may be configured to receive (or, configured with) the positioning information from another UE or the LS. One or more pieces of configuration information may be received. For example, the SL-PRS information may be determined to configure only one pattern and may allow to configure one or more pattern information. If one or more pattern information is configured, the UE may transmit corresponding configuration information to the base station and the LS. The LS may determine and indicate an appropriate SL-PRS pattern to the UE. By contrast, the UE may determine the pattern used in one or more SL-PRS pattern information and broadcast, unicast, and/or groupcast corresponding information to another UE via the SL. At this time, the corresponding information may be indicated through the SCI (e.g., $1^{st}$ stage SCI or $2^{nd}$ stage SCI), the PC5-RRC or the SL MAC-CE. In addition, the positioning method information may be determined to (pre-)configure only one method, and it may be allowed to (pre-)configure information of one or more positioning methods. The positioning method may be information indicating UE-based or UE-assistance. Alternatively, the positioning method may be information indicating the absolute positioning, the relative positioning, or the ranging. Alternatively, the positioning method may be information of the SL-TDOA, the SL-AOD, the SL multi-RTT, the SL E-CID, or the SL-AOA.

According to an embodiment of the disclosure, in case that one or more pieces of pattern information is configured, the UE may transmit corresponding configuration information to the base station or the LS. The LS may determine and indicate an appropriate positioning method to the UE. By contrast, the UE may determine the method to use in one or more positioning method information and broadcast, unicast, and/or groupcast corresponding information to another UE via the SL. The corresponding information may be indicated through the SCI (e.g., $1^{st}$ stage SCI or $2^{nd}$ stage SCI), the PC5-RRC or the SL MAC-CE.

In case that performing the positioning via the SL, the UE may transmit a positioning signal via the SL. The positioning signal may include the SL-PRS. Methods for transmitting the positioning signal in the SL may be divided into two as below.

The PosRef UE transmits a positioning signal to the target UE.

The target UE transmits a positioning signal to the PosRef UE.

According to the adopted positioning method, one or both of the two transmission methods may be performed. For example, in case that the SL-TDOA is performed, the SL-PRS may be transmitted to perform the SL positioning as the first method. By contrast, if the SL multi-RTT or the SL RTT is performed, both of the SL-PRS transmission methods may be performed, such as when the SL multi-RTT or the SL RTT is performed. Referring back to FIG. 7, UE-A and UE-B may correspond to the target UE and the PosRef UE respectively. UE-A and UE-B are not limited to the target UE and the PosRef UE in FIG. 7, however, and UE-A may correspond to the PosRef UE, and UE-B may correspond to the target UE. The SL-PRS transmitted from the PosRef UE to the target UE and the SL-PRS transmitted from the target UE to the PosRef UE may be the same or different positioning signals.

In the SL, the UE may perform the absolute positioning, the relative positioning, and/or the ranging. As previously discussed, the absolute positioning (absolute location) may indicate two-dimensional (x, y) and three-dimensional (x, y, z) coordinate position information of the UE based on the longitude and the latitude. For the absolute positioning, the target UE may need a plurality of PosRef UEs and may need to receive known location information from the plurality of the PosRef UEs for the absolute positioning. For example, if the target UE performs the RTT with the plurality of the PosRef UEs, a plurality of pairs may exist between the target UE and the one PosRef UE of FIG. 7. The plurality of the pairs between the target UE and the one PosRef UE may be referred to as the multi-RTT.

The relative positioning (relative location) may indicate relative two-dimensional or three-dimensional location information from another UE. Accordingly, for the relative positioning, the target UE may require, for example, only one PosRef UE as shown in FIG. 7. In addition, the target UE may need to receive known location information from corresponding PosRef UEs. By additionally measuring or receiving direction information, the target UE may obtain the relative two-dimensional or three-dimensional location information from the PosRef UE.

The ranging may indicate measuring the distance or the direction from another UE. The distance measurement may require, for example, only one PosRef UE as shown in FIG. 7. If the distance or the direction is measured from the other UE, it may be unnecessary to receive the known location information from the PosRef UEs. If the ranging embraces both the distance information and the direction information in the SL, the ranging may have the same meaning as the relative positioning.

The second embodiment suggests a method of selecting and allocating a resource to transmit an SL positioning signal. As mentioned above, the SL positioning signal may include the following.

S-PRS

Location information transfer

The SL positioning signal is not limited to the above signals in the disclosure. For example, the positioning signal may request the SL-PRS or a signal including necessary information for the positioning. The UE may allocate a resource for the positioning signal transmission and transmit the signals in the corresponding resource. The resource allocation method for the positioning signal transmission may consider the following alternatives. However, the resource allocation method for the positioning signal transmission is not limited to the following alternatives in the disclosure.

alternative 1 including positioning signal transmission in a resource region transmitting PSSCH, and alternative 2 including positioning signal transmission in a dedicated resource separated from the resource region transmitting PSSCH.

In alternative 1, the UE may transmit the positioning signal according to the existing SL resource allocation method for the PSSCH transmission, for the positioning signal transmission. For example, the UE may be allocated a resource for the PSSCH transmission from the base station, or may directly allocate a resource for the PSSCH transmission through sensing and resource selection. In case that the positioning signal is transmitted in the resource region transmitting the PSSCH in alterative 1, resource efficiency may be improved by sharing the positioning signal and PSSCH transmission resources. However, the positioning signal and the signal transmitted over the PSSCH may be subject to collision and interference. The collision and the interference of the positioning signal and the signal transmitted over the PSSCH may limit the SL positioning accuracy.

By contrast, a method for transmitting a positioning signal in the dedicated resource separated from the resource region transmitting the PSSCH as in alternative 2 may be considered. For example, the UE may be allocated a resource for the positioning signal transmission separated from the resource region for the PSSCH transmission from the base station, or the UE may directly allocate a resource for the positioning signal transmission separated from the resource region through the sensing and the resource selection. The method (e.g., Alternative 2) may improve the resource efficiency by avoiding resource collision and interference of the signal transmitted over the PSSCH and the positioning signal. In addition, the SL-PRS transmission resource allocation may more flexibly allocate transmission time and frequency regions of the SL-PRS. However, the transmission resources of the positioning signal and the PSSCH are always used separately, which limits the resource efficiency.

According to an embodiment, the resource allocation method for the positioning signal transmission may use one or both of alternative 1 and alterative 2. In case that both alternative 1 and alterative 2 are considered, a method for (pre-)configuring which one is supported may be considered. For example, in case that alternative 1 or alternative 2 is (pre-)configured, the UE may operate according to the (pre-)configured alternative. However, in case that one or both of alternatives 1 and 2 is (pre-)configured, the UE may need to operate by selecting one alternative. In this case, the UE may broadcast, unicast, or groupcast the selected alternative for the operation to another UE via the SL. In so doing, information of the selected alternative may be indicated through SCI (e.g., $1^{st}$ stage SCI or $2^{nd}$ stage SCI), PC5-RRC or SL MAC-CE. If both alternatives are used, the UE may select one of the alternatives according to a condition which may be the required positioning accuracy. For example, if high positioning accuracy is required, the UE may select alterative 2 to avoid the resource collision and interference of the signal transmitted over the PSSCH and the positioning signal. By contrast, in case that high positioning accuracy is not required, the UE may select alterative 1. As an example, among the positioning signals, the SL-PRS may be based on alternative 2 and the other positioning signal such as the measurement report or the location information transfer may be based on alternative 2.

Figure 10:
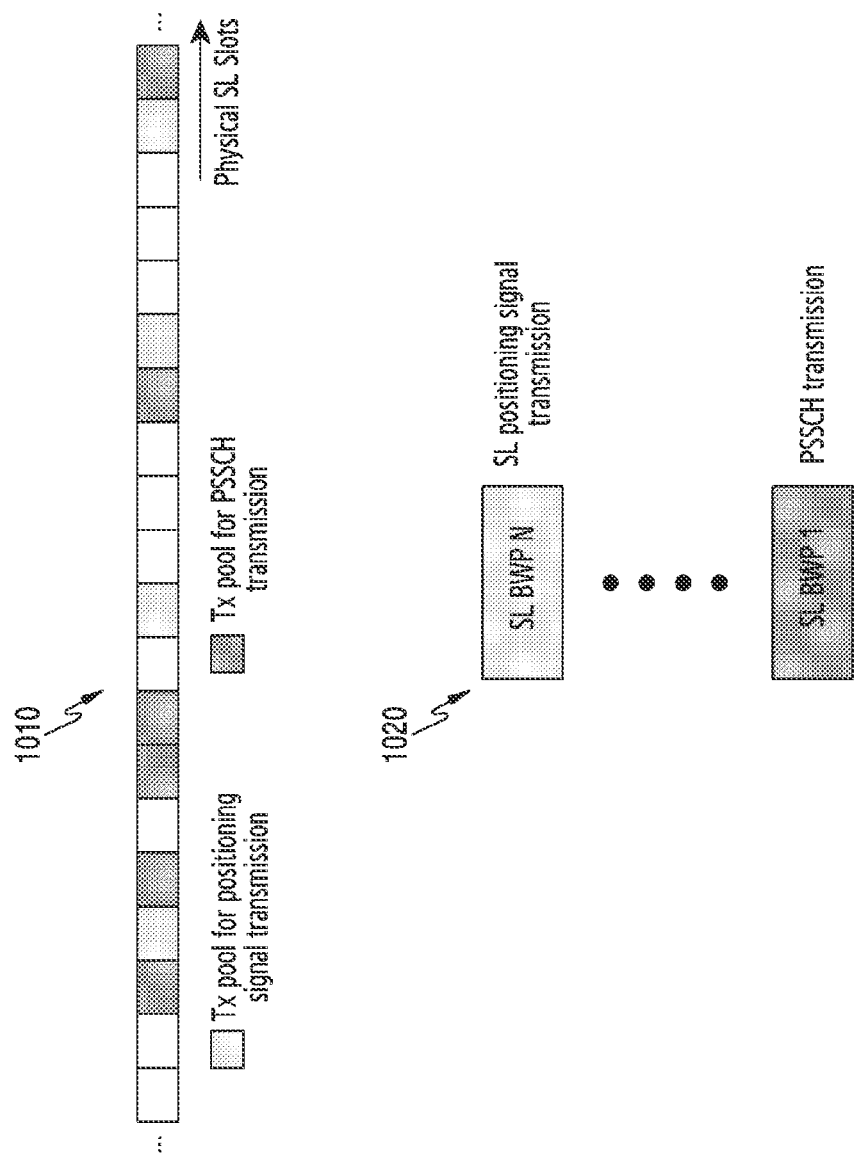
FIG. 10 illustrates a method for transmitting an SL-PRS in a dedicated resource region separated from a resource region in which a PSSCH is transmitted according to an embodiment.

FIG. 10 illustrates a method for transmitting an SL-PRS in a dedicated resource region separated from a resource region transmitting the PSSCH (e.g., Alternative 2) according to an embodiment.

Referring to FIG. 10, a method 1010 for separating a resource region transmitting the PSSCH and a resource region transmitting the positioning signal through Tx pools is shown. For example, the method 1010 for separating the resource region transmitting the PSSCH and the resource region transmitting the positioning signal with the Tx pools may separate the transmission resource regions by not overlapping the Tx pool of the PSSCH and the Tx pool of the positioning signal in the time domain.

According to an embodiment, a method 1020 for separating the resource region transmitting the PSSCH and the resource region transmitting the positioning signal through SL BWPs is shown. If a plurality of SL BWPs is supported in the SL, a particular SL BWP may be separated as the BWP for the PSSCH transmission and another SL BWP separated from the particular SL BWP may be separated as the BWP for the positioning signal transmission through the division in the frequency domain. However, SL BWP switching of the UE may be further required to support this method. The method for transmitting the positioning signal in the dedicated resource region separated from the resource region transmitting the PSSCH is not limited to the methods described in FIG. 10 of the disclosure. Alternative 2 may be limited to the SL-PRS.

A suggested method herein may perform the resource allocation for the positioning signal in the dedicated resource region separated from the resource region transmitting the PSSCH. The resource allocation may include both Mode 1 and Mode 2. As stated above, in Mode 1, the base station performs the resource allocation and provides resource allocation information to the UE through the DCI, and the base station may receive necessary information for the positioning signal transmission resource allocation from the target UE or the LS. The information may be positioning requirement information required for the SL positioning. Based on the resource allocation information indicated through the corresponding DCI in Mode 1, the UE may perform the resource allocation and indicate corresponding information to another UE using the SCI. By contrast, in Mode 2, the UE directly performs the resource allocation through the sensing, and then provides resource reservation information to the other UE through the SCI. The DCI for the positioning signal transmission resource allocation in Mode 1 may be a new DCI format distinguished from the existing DCI format 3_0. For example, the DCI for the positioning signal transmission resource allocation in Mode 1 may be DCI format 3_1. The SCI indicating the positioning signal transmission resource allocation information in Mode 2 may be a new SCI format distinguished from the existing SCI format 1_A. For example, the SCI indicating the positioning signal transmission resource allocation information in Mode 2 may be SCI format 1_B.

In the selection and the allocation of the positioning signal transmission resource, the UE and the base station may need to select a symbol length allocable for the SL-PRS in one slot, the number of sub-channels allocable for SL-PRS in one slot, an SL-PRS repetition factor, an SL-PRS latency bound, an SL-PRS transmission frequency-domain density, an SL-PRS comb size, and SL-PRS power to satisfy the positioning requirements but the disclosure is not limited to these parameters, which are further described below.

A Symbol Length Allocable for the S-PRS in One Slot

The symbol length allocable for the SL-PRS in one slot may refer to FIG. 8 and FIG. 9.

Returning to FIG. 8 and FIG. 9, the SL-PRS may be designed in various symbol lengths. The symbol length allocable for the SL-PRS in one slot may be (pre-)configured. In this case, (pre-)configured symbol length allocable for the SL-PRS in one slot may be set to one or more values. If the (pre-)configured symbol length allocable for the SL-PRS is set to one or more values, the UE may determine the SL-PRS symbol length and indicate corresponding information to another UE using SCI (e.g., $1^{st}$ stage SCI or $2^{nd}$ stage SCI), PC5-RRC or SL MAC-CE. A new SCI format may be defined for the SCI indication. The UE may determine a start position and a length of symbols transmitting the SL-PRS in the slot according to the SL-PRS resource allocation result.

The Number of Sub-Channels Allocable for S-PRS in One Slot

The number of sub-channels allocable for the SL-PRS in one slot may be also (pre-)configured. If the (pre-)configured number of sub-channels allocable for the SL-PRS is set to one or more values, the UE may determine the number of sub-channels, and indicate corresponding information to another UE using SCI (e.g., $1^{st}$ stage SCI or $2^{nd}$ stage SCI), PC5-RRC or SL MAC-CE. For the SCI indication, a new SCI format may be defined. The UE may determine the number of sub-channels allocated for the SL-PRS in the slot according to the SL-PRS resource allocation result.

S-PRS Repetition Factor

The SL-PRS repetition factor indicates that the SL-PRS is repeatedly transmitted in one or more slots, and the repetition factor may be (pre-)configured. In this case, the (pre-)configured SL-PRS repetition factor may be set to one or more values. The SL-PRS repetition may be disabled according to a corresponding set value. The (pre-)configured SL-PRS repetition factor is set to one or more values, the UE may determine the SL-PRS repetition factor, and indicate corresponding information to another UE using SCI (e.g., $1^{st}$ stage SCI or $2^{nd}$ stage SCI), PC5-RRC or SL MAC-CE. For the SCI indication, a new SCI format may be defined. The UE may determine the SL-PRS repetition factor according to the SL-PRS resource allocation result. The SL-PRS repetition factor may be applied in consecutive logical slots of the SL. However, the disclosure is not limited thereto and the SL-PRS repetition factor may be applied to discontinuous logical slots of the SL. Alternatively, the SL-PRS repetition factor may be applied only to physically consecutive slots.

S-PRS Latency Bound

The SL-PRS latency bound is the SL-PRS transmission requirement. In the SL-PRS transmission resource allocation, if corresponding resource transmission is delayed, delay may occur in the positioning, rendering it necessary to satisfy the SL-PRS latency bound in the SL-PRS transmission resource selection and allocation. A value related to the SL-PRS latency bound may be (pre-)configured.

S-PRS Transmission Frequency-Domain Density

The SL-PRS transmission frequency-domain density may indicate whether the SL-PRS is transmitted every RB on the frequency axis domain (or, frequency domain) with a RB-based density of 1, whether the SL-PRS is transmitted every two RBs on the frequency axis domain (or, frequency domain) with the RB-based density of ½, and/or whether the SL-PRS is transmitted every four RBs on the frequency axis domain with the RB-based density of ¼, and the SL-PRS transmission frequency-domain density may be (pre-)configured. The (pre-)configured S-PRS frequency-domain density based on the RB may be set to one or more values. When the (pre-)configured SL-PRS frequency-domain density based on the RB is set to one or more values, the UE may determine the SL-PRS frequency-domain density based on the RB, and indicate corresponding information to another UE using SCI (e.g., $1^{st}$ stage SCI or $2^{nd}$ stage SCI), PC5-RRC or SL MAC-CE. For the SCI indication, a new SCI format may be defined. The UE may determine the SL-PRS frequency-domain density based on the RB according to the SL-PRS resource allocation result. The SL-PRS repetition factor may be applied in consecutive logical slots of the SL. However, the disclosure is not limited thereto, and the SL-PRS repetition factor may be applied to discontinuous logical slots of the SL. Alternatively, the SL-PRS repetition factor may be applied only to physically consecutive slots.

S-PRS Comb Size

The SL-PRS comb size refers to FIG. 8 and FIG. 9 which teach that the SL-PRS may be transmitted in various comb sizes. The comb size allocable for SL-PRS may be (pre-)configured. The (pre-)configured comb size may be set to one or more values. In case that the (pre-)configured S-PRS comb size is set to one or more values, the UE may determine the SL-PRS comb size and indicate corresponding information to another UE using SCI (e.g., $1^{st}$ stage SCI or $2^{nd}$ stage SCI), PC5-RRC or SL MAC-CE. A new SCI format may be defined for the SCI indication. The UE may determine the SL-PRS comb size according to the SL-PRS resource allocation result.

S-PRS Power

The SL-PRS power may be adjusted based on SL pathloss or DL pathloss and an adjustable power range may be (pre-)configured.

Since the time axis and frequency regions transmitting the SL-PRS increase as the symbol length allocable for the SL-PRS in one slot increases, the number of the sub-channels allocable for the SL-PRS in one slot increases, the SL-PRS repetition factor increases, the SL-PRS transmission frequency-domain density increases, and the SL-PRS comb size decreases, the positioning accuracy may be improved. The positioning accuracy may be improved as the SL-PRS power increases. Hence, in the SL-PRS transmission resource selection and allocation, the UE and the base station may determine the allocated SL-PRS symbol length, the number of the allocated SL-PRS sub-channels, the SL-PRS repetition factor, the SL-PRS transmission frequency-domain density, and/or the SL-PRS comb size, to satisfy the positioning requirements. The UE and the baes station may also adjust the SL-PRS power.

If a plurality of Tx resource pools for the SL-PRS transmission is configured for the UE and the UE needs to select one Tx resource pool for the SL-PRS transmission, the UE may select the Tx resource pool for the SL-PRS transmission based on parameter related configuration information (pre-)configured in the Tx resource pools, including symbol length allocable for SL-PRS in one slot, the number of sub-channels allocable for SL-PRS in one slot, an SL-PRS repetition factor, an SL-PRS latency bound, an SL-PRS transmission frequency-domain density, an SL-PRS comb size, and an SL-PRS power.

For example, the UE may select the Tx resource pool to satisfy the positioning accuracy. For example, in case that the Tx resource pools A and B are configured, the Tx resource pool A has a short SL-PRS allocable symbol length (pre-)configured, and the Tx resource pool B has a long SL-PRS allocable symbol length (pre-)configured, the UE may select the Tx resource pool B for high positioning accuracy requirement.

Figure 11:
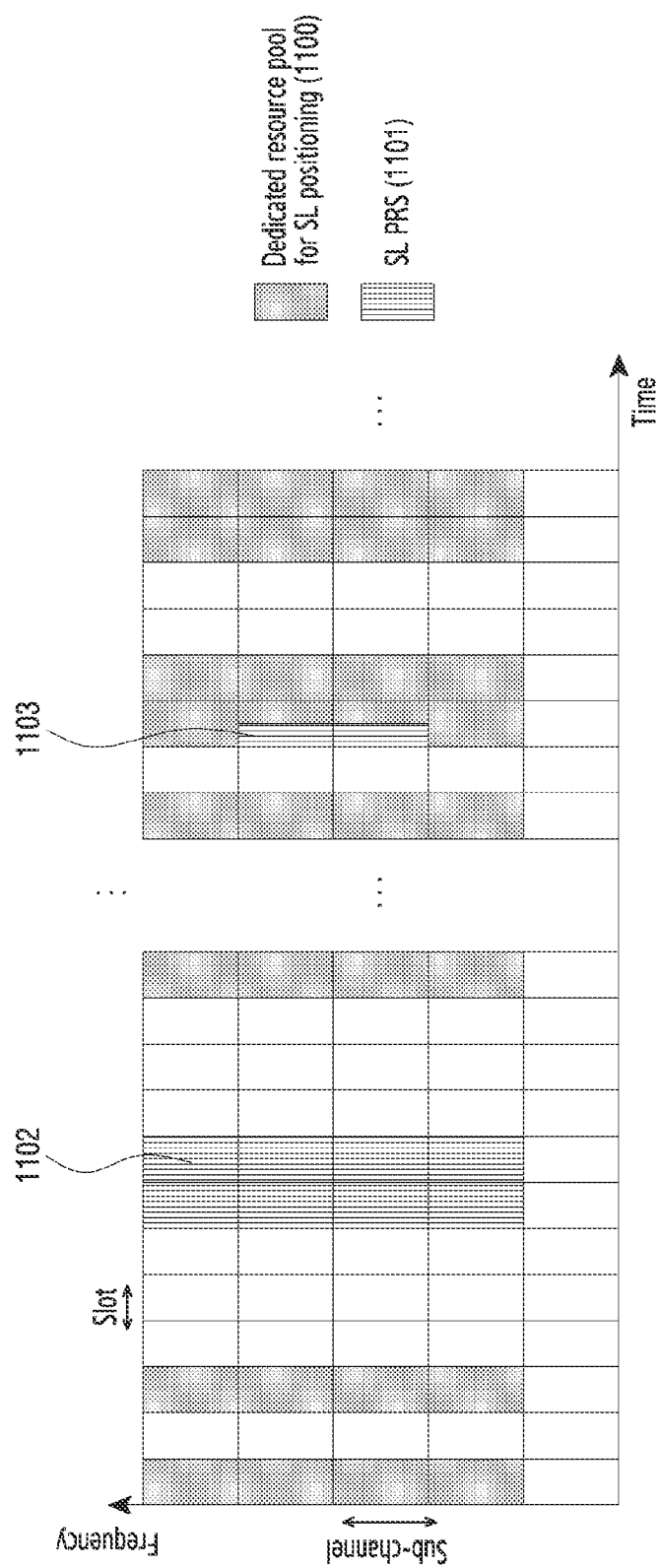
FIG. 11 illustrates an example of applying suggested parameters when selecting and allocating transmission resources of an SL-PRS according to an embodiment.

FIG. 11 illustrates an example of applying suggested parameters in transmission resource selection and allocation of an SL-PRS according to an embodiment.

Referring to FIG. 11, a resource pool region 1100 indicates a dedicated resource pool region allocated for the SL positioning, that is, for the SL-PRS transmission. The corresponding region may be distinguished from a resource pool region transmitting the PSSCH. A resource region SL-PRS 1101 is allocated for the SL-PRS transmission in the resource pool region 1100, and different examples are shown in a first region 1102 and a second region 1103. Specifically, in the first region 1102, the SL-PRS is allocated to every symbol in one slot, SL-PRS repetition factor=2 (repetition in two slots), and four sub-channels on the frequency axis (or, frequency domain) are allocated for the SL-PRS transmission region. By contrast, in the second region 1103, the SL-PRS is allocated to some symbols in one slot, SL-PRS repetition factor=1 (no repetition), and two sub-channels on the frequency axis (or, frequency domain) are allocated for the SL-PRS transmission region. Since the first region 1102 allocates more resources for the SL-PRS transmission than the second region 1103, the first region 1102 may be more advantageous than the second region 1103 in improving the positioning accuracy.

The third embodiment suggests a slot structure for transmitting an SL positioning signal. For example, the corresponding slot structure may differ from the existing SL slot structure in the SL-PRS transmission. The second embodiment has described that mapping the SL-PRS to the time and frequency resource regions may differ depending on the SL-PRS transmission resource allocation. The third embodiment explains the slot structure for transmitting the SL positioning signal and a method for mapping the SL-PRS to the time and frequency regions of the slot according to the SL-PRS transmission resource allocation.

Figure 12:
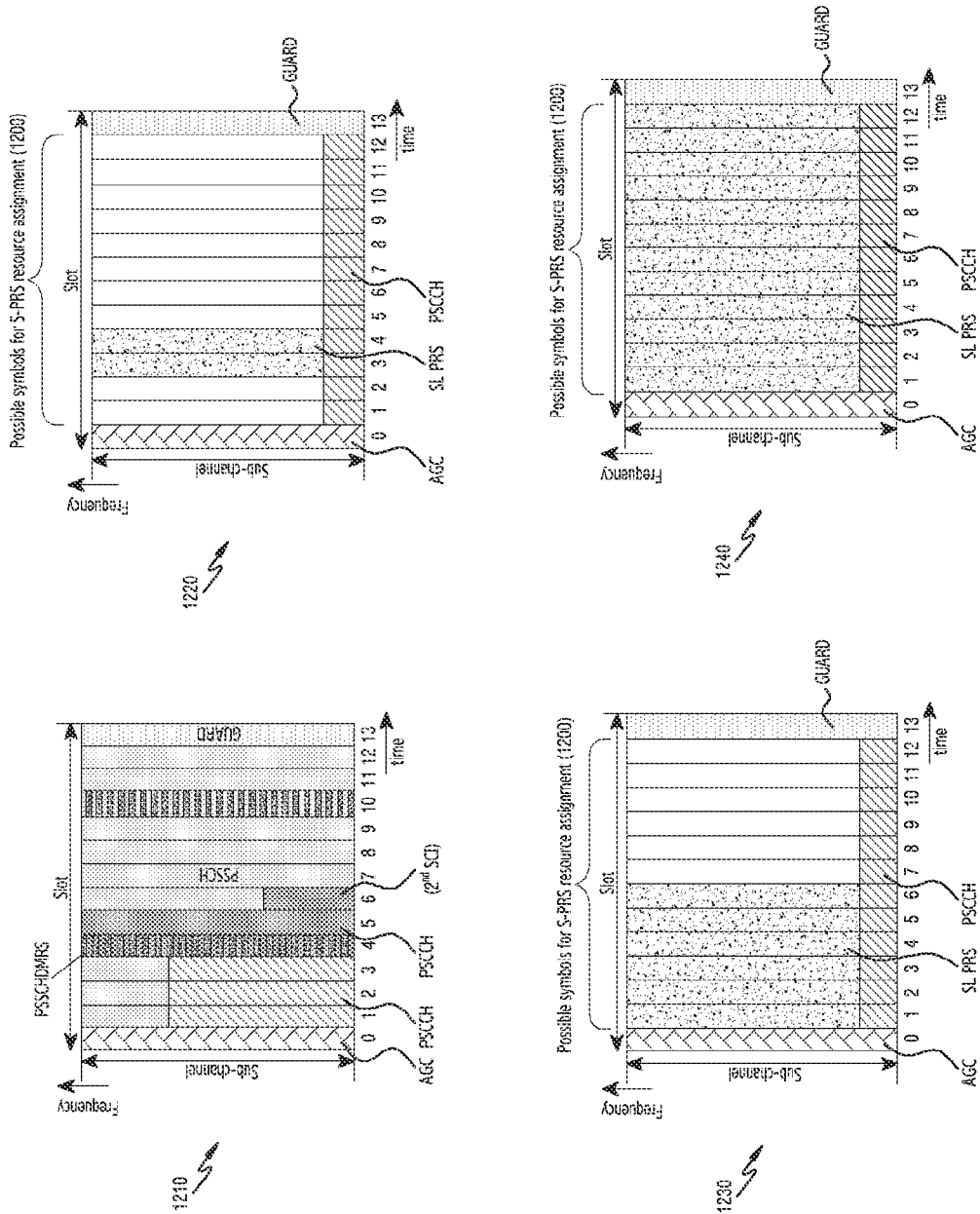
FIG. 12 illustrates slot structures for transmitting an SL-PRS according to an embodiment.

FIG. 12 illustrates slot structures for transmitting a corresponding SL positioning signal according to an embodiment.

Referring to FIG. 12, examples of the SL slot structure for the PSSCH transmission are depicted. For example, as shown in a first SL slot structure 1210 of FIG. 12, a first symbol is used for automatic gain control (AGC) and the last symbol is used as a guard symbol for the UE to switch the reception and the transmission. A second symbol may be duplicated and used as the AGC symbol. In addition, as shown in the first SL slot structure 1210 of FIG. 12, the PSCCH (e.g., $1^{st}$ SCI transmission) and the PSSCH (e.g., data transmission) are multiplexed and transmitted. For example, the PSCCH may be transmitted by mapping consecutive two or three symbols with the PSSCH starting from the lowest PRB of the PSSCH scheduled after the AGC symbol in the TDM or TDM+FDM manner. In addition, a $2^{nd}$ SCI may be mapped and transmitted from a first PSSCH DMRS symbol in the PSSCH region. If the first SL slot structure 1210 transmits the SL-PRS, then one or more of constraints including the SL-PRS being transmitted in a symbol transmitting PSSCH, the SL-PRS not being transmitted in a symbol transmitting PSSCH, the SL-PRS not being transmitted in a symbol transmitting $2^{nd}$ SCI, and the SL-PRS not being transmitted in a symbol transmitting PSSCH DMRS, may be applied.

In case that the above constraints are transmitted and the SL-PRS is transmitted in the first SL slot structure 1210, the number of symbols for transmitting the SL-PRS may be limited.

A second SL slot structure 1220, a third SL slot structure 1230 and/or a fourth SL slot structure 1240 of FIG. 12 show the SL slot structure examples for the positioning signal transmission. For example, as shown in the second SL slot structure 1220, the third SL slot structure 1230 and/the fourth SL slot structure 1240 of FIG. 12, a first symbol is used as the AGC symbol and the last symbol is used as the guard symbol. A second symbol may be duplicated and used as the AGC symbol, or the first symbol transmitting the SL-PRS may be duplicated and used as the AGC symbol if the second symbol transmits no signal. However, the disclosure is not limited thereto, and the first symbol transmitting the SL-PRS may always be duplicated and used as the AGC symbol.

To address the limited number of the symbols for transmitting the SL-PRS in case that the first SL slot structure 1210 of FIG. 12 is used, a new slot structure designed for the S-PRS-PRS transmission may be considered. For example, the $2^{nd}$ SCI transmission may be unnecessary. However, the $1^{st}$ SCI transmission over the PSCCH may be required for the sensing and the SL-PRS related information indication of the UE. As described in FIG. 8 and FIG. 9, in case that the various SL-PRS symbol lengths are considered and the start position and the length of the symbols transmitting the SL-PRS in the slot are determined according to the SL-PRS resource allocation, it may be more advantageous to multiplex the PSCCH (e.g., $1^{st}$ SCI transmission) and SL-PRS transmission regions using the FDM as shown in the first SL slot structure 1220, the third SL slot structure 1230 and/the fourth SL slot structure 1240 of FIG. 12. This is because, in case that the PSCCH is transmitted as shown in the first SL slot structure 1220 of FIG. 12, the frequency region allocated the SL-PRS may differ in the symbol region transmitting the PSCCH and a symbol region not transmitting the PSCCH. For example, the first SL slot structure 1220, the third SL slot structure 1230 and/the fourth SL slot structure 1240 of FIG. 12 may correspond to the slot structure which multiplexes the PSCCH (the $1^{st}$ SCI transmission) and SL-PRS transmission regions in the FDM manner. In this case, the frequency region allocated for the PSCCH may be positioned at the bottom of the SL-PRS transmission region and may occupy a fixed frequency region of X RB. At this time, X=2 RB may be considered but the PSCCH mapping of the disclosure is not limited to the methods explained in the first SL slot structure 1220, the third SL slot structure 1230 and/the fourth SL slot structure 1240 of FIG. 12. According to the second SL slot structure 1220 of FIG. 12, only two symbols of symbol index=3, 4 are selected and allocated in a symbol region 1200 for transmitting the SL-PRS. According to the third SL slot structure 1230 of FIG. 12, six symbols of symbol index=1~6 are selected and allocated in the symbol region 1200 for transmitting the SL-PRS. According to the fourth SL slot structure 1240 of FIG. 12, 12 symbols of symbol index=1~12 are selected and allocated in the symbol region 1200 for transmitting the SL-PRS. In FIG. 12, the UE may indicate not only the number of the symbols transmitting the SL-PRS and the location information but also the SL-PRS related parameter configuration information mentioned in the second embodiment, through the PSCCH (the $1^{st}$ SCI transmission).

It has been described that the following alternatives may be considered for the resource allocation method for the positioning signal transmission in the second embodiment.

Alternative 1: positioning signal transmission in the resource region transmitting the PSSCH Alternative 2: positioning signal transmission in the dedicated resource separated from the resource region transmitting the PSSCH The fourth embodiment suggests a congestion control method based on alternatives 1 and 2 described above in the second embodiment.

Since alternative 1 considers the positioning signal transmission in the resource region transmitting the PSSCH, the congestion control method considered in the PSSCH transmission may be reutilized by considering the positioning signal. In the positioning signal transmission, alternative 1 may consider Case 1 in which the positioning signal and data in PSSCH region are transmitted, and Case 2 in which only the positioning signal in the PSSCH region is transmitted.

The positioning signal may include all the positioning related information such as measurement report and location information transfer, including the SL-PRS. However, the disclosure is not limited thereto and the positioning signal may be limited to only the SL-PRS, in which case the positioning related information such as measurement report and location information transfer may be classified into the data transmission. In addition, a priority of the corresponding signal may differ according to the type of the positioning signal. For example, the priority for the SL-PRS transmission, the priority for the measurement report, and/or the priority for the location information transfer may be determined separately. The priority of the positioning signal may not be the same as a priority of general data which is not the positioning related information transmitted over the PSSCH. Hence, Case 1 may be subdivided into Case 1-1 in which the positioning signal (SL-PRS) and data (general data information which is not the positioning related information) are transmitted in the PSSCH region, and Case 1-2 in which the SL-PRS and data (positioning related information) are transmitted in the PSSCH region.

In Case 1-1 and Case 1-2, the positioning signal is limited to the SL-PRS in the PSSCH region. The data transmission may be divided into the positioning related information (e.g., Case 1-2) and no positioning related information (e.g., Case 1-1). For example, Case 1-1 and Case 1-2 may transmit the SL-PRS in some region of the slot and transmit the data in another region of the slot as shown in the first SL slot structure 1220, the third SL slot structure 1230 and/the fourth SL slot structure 1240 of FIG. 12. In the congestion control of Case 1 (e.g., Case 1-1 and Case 1-2), the UE may determine the transmission parameter, which refers to a fifth embodiment described below, based on a CBR and the priority. Details of the CBR measurement refer to a sixth embodiment. Details of the transmission parameter refer to a fifth embodiment. If the UE performs the congestion control in Case 1, the priority may consider one of the following assumptions. It is noted that the priority assumptions are not limited thereto in the disclosure.

In assumption 1, the priority for the data transmission is assumed. The corresponding priority may be determined by an upper node of the UE and mapped to a priority provided in the $1^{st}$ SCI over the PSCCH.

in assumption 2, the priority for the positioning signal (the SL-PRS) is assumed. The corresponding priority may be determined by an upper node of the UE and provided in SCI ($1^{st}$ SCI) over the PSCCH. If the UE indicates in the SCI, a new SCI format may be defined.

in assumption 3, a maximum (max) priority for the positioning signal SL-PRS) for the data transmission is assumed. The corresponding priorities may be determined by an upper node of the UE and a max priority value may be provided in SCI ($1^{st}$ SCI) over the PSCCH. If the UE indicates in the SCI, a new SCI format may be defined.

in assumption 4, a minimum (min) priority for the positioning signal SL-PRS for the data transmission is assumed. The corresponding priorities may be determined by an upper node of the UE and a minimum priority value may be provided in SCI ($1^{st}$ SCI) over the PSCCH. If the UE indicates in the SCI, a new SCI format may be defined.

By contrast, since Case 2 transmits only the positioning signal in the PSSCH region, the UE may determine the transmission parameter based on the CBR and the positioning signal priority in the congestion control. The corresponding priority may be determined by an upper node of the UE and provided in the SCI (e.g., 1st SCI) over the PSCCH. If the UE indicates in the SCI, a new SCI format may be defined. In addition, since Case 2 transmits the positioning signal in the resource region transmitting the PSSCH according to alternative 1, the UE may be allocated the resource from the base station for the PSSCH transmission (Mode 1), or the UE may directly allocate the resource through the sensing (e.g., Mode 2). If the UE performs the PSSCH transmission, the following situations may occur. The UE may determine whether to perform Case 2 according to the following situations.

In situation 1, a signal to transmit in the PSSCH region includes only the SL-PRS. In this case, the UE may transmit the SL-PRS in the PSSCH region according to Case 2. The priority of the SL-PRS may be determined by an upper node of the UE and provided in the SCI (e.g., 1st SCI) over the PSCCH. The corresponding priority may be used for the congestion control.

In situation 2, a signal to transmit in the PSSCH region includes only a data signal (the positioning related information). In this case, the UE may transmit the data signal (e.g., the positioning related information) in the PSSCH region. The priority of the data signal (e.g., the positioning related information) may be determined by an upper node of the UE and provided in SCI (e.g., 1st SCI) over the PSCCH. The corresponding priority may be used for congestion control.

In situation 3, a signal to transmit in the PSSCH region includes only a data signal (general data information other than the positioning related information). In this case, the UE may transmit the data signal (e.g., general data information other than the positioning related information) in the PSSCH region. The priority of the data signal (e.g., general data information other than the positioning related information) may be determined by an upper node of the UE and provided in SCI (e.g., 1st SCI) over the PSCCH. The corresponding priority may be used for congestion control.

In situation 4, a signal to transmit in the PSSCH region includes the SL-PRS and the data (the positioning related information). In this case, the UE may always prioritize the SL-PRS, always prioritize the data signal (e.g., the positioning related information), or determine a signal to transmit based on the priority of the SL-PRS and the positioning related information. The priority of the positioning signal and the data signal may be determined by an upper node of the UE. Based on the priority, the UE may determine the transmit signal based on the greater priority value of the two corresponding signals. The priority of the transmit signal may be provided in SCI (e.g., 1st SCI) over the PSCCH. The corresponding priority may be used for congestion control.

In situation 5, a signal to transmit in the PSSCH region includes the SL-PRS and the data signal (general data information other than the positioning related information), In this case, the UE may always prioritize the SL-PRS, always prioritize the data signal (e.g., general data information other than the positioning related information), or determine a signal to transmit based on the priority of the SL-PRS and the data signal (e.g., general data information other than the positioning related information). The priority of the positioning signal and the data signal may be determined by an upper node of the UE. Based on the priority, the UE may determine the transmit signal based on the greater priority value of the two corresponding signals. The priority of the transmit signal may be provided in SCI (e.g., 1st SCI) over the PSCCH. The corresponding priority may be used for congestion control.

In situation 6, a signal to transmit in the PSSCH region includes the SL-PRS and the data signal (e.g., positioning related information and general data information other than the positioning related information), In this case, the UE may always prioritize the SL-PRS, always prioritize the data signal (e.g., the positioning related information), always prioritize the data signal (e.g., general data information other than the positioning related information), or determine a signal to transmit based on the priority of the SL-PRS, prioritize the data signal (e.g., the positioning related information), and another data signal (e.g., general data information other than the positioning related information). The priority of the positioning signal and the data signal may be determined by an upper node of the UE. Based on the priority, the UE may determine the transmit signal based on the greater priority value of the corresponding signals. The priority of the transmit signal may be provided in SCI (e.g., 1st SCI) over the PSCCH. The corresponding priority may be used for congestion control.

In situation 7, a signal to transmit in the PSSCH region includes a data signal (positioning related information) and another data signal (general data information other than the positioning related information, In this case, the UE may always prioritize the data signal (the positioning related information), always prioritize the data signal (e.g., general data information other than the positioning related information), or determine a signal to transmit based on the priority of the data signal (e.g., the positioning related information) and another data signal (e.g., general data information other than the positioning related information). The priority of the positioning signal and the data signal may be determined by an upper node of the UE. Based on the priority, the UE may determine the transmit signal based on the greater priority value of the two corresponding signals. The priority of the transmit signal may be provided in SCI (e.g., 1st SCI) over the PSCCH. The priority may be used for congestion control.

In case that the positioning signal is transmitted in the dedicated resource region, alternative 2 may consider the following detailed alternatives, although the disclosure is not limited thereto.

In alternative 2-1, the dedicated resource region transmits data (e.g., positioning related information) as well as an SL-PRS. In alternative 2-2, the dedicated resource region transmits SL-PRS alone. Alternative 2-1 may consider the congestion control method, similarly to previously described Case 1-2, and alternative 2-2 may consider the congestion control method, similarly to situation 1 in previously described Case 2. Since alternative 2 considers the positioning signal transmission in the dedicated resource region separated from the resource region transmitting the PSSCH, a congestion control method for the positioning signal transmission may be separately defined. In congestion control, the UE may determine the transmission parameters based on the CBR and the priority of the positioning signal. The CBR measurement is described below in relation to the sixth embodiment, while the transmission parameters will now be described in relation to the fifth embodiment.

The fifth embodiment suggests a transmission parameter control method based on the congestion control of the positioning signal transmission. The UE may determine (or, identify) whether to transmit the positioning signal, and related transmission parameters by considering the congestion of the SL transmission. For example, the SL-PRS may vary in the transmission type on the time axis (or, time domain) and the frequency axis (or, frequency domain) from the PSSCH transmission and accordingly parameters for the SL-PRS transmission may be defined differently from the PSSCH transmission. The congestion control method of the SL-PRS (i.e., determining an available parameter range based on the CBR and the priority) may be limited to the method in which the UE directly selects the SL-PRS transmission resource through the sensing. If directly selecting the SL-PRS transmission resource through the sensing, the UE may finally determine one parameter in the available parameter range according to the sensing and resource selection results and transmit or indicate the determined parameter information to another UE. The determined parameter information may be transmitted or indicated to the another UE through SCI (e.g., $1^{st}$ SCI or $2^{nd}$ SCI), PC5-RRC or SL MAC-CE from the UE to the another UE. By contrast, if the UE is in the base station coverage and is allocated the SL-PRS transmission resource from the base station or the LS, the base station may determine and indicate the SL-PRS transmission parameter for the UE through DL control information (DCI) for the UE, DL RRC, or DL MAC-CE of the base station.

According to an embodiment, when performing congestion control, the UE may determine the transmission parameters based on the CBR and the priority. The CBR measurement is described below in relation to the sixth embodiment. The priority was described above in the fourth embodiment. However, the congestion control for the SL positioning signal may consider using only the CBR without using the priority.

Figure 13:
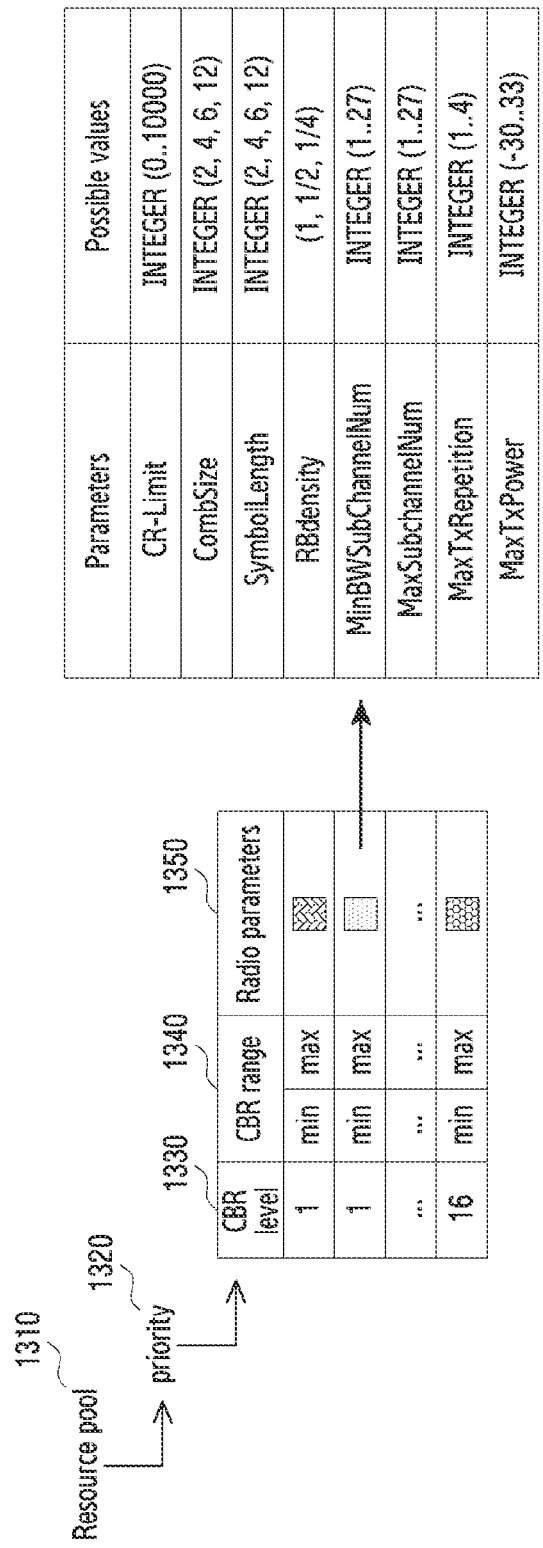
FIG. 13 illustrates a method for determining transmission parameters based on congestion control when transmitting an SL-PRS according to an embodiment.

FIG. 13 illustrates a method for determining transmission parameters based on congestion control in SL positioning signal transmission according to an embodiment.

Referring to FIG. 13, a transmission parameter range 1350 corresponding to a CBR range 1340, a CBR level 1330, and/or a priority 1320 of a transmit signal may be (pre-)configured through resource pool configuration 1310. values (e.g., the transmission parameter range 1350 corresponding to the CBR range 1340, the CBR level 1330, and/or the priority 1320 of the transmit signal) may be (pre-)configured in the UE before the UE is connected to the base station, and may be configured from the base station through the SIB. Alternatively, the corresponding values may be configured UE-specifically after RRC connection with the base station. The values may be configured through PC5-RRC connection between the UE and the UE. The UE for the congestion control performs the CBR measurement, as described below in the sixth embodiment. The CBR may be measured as a value between 1 and 100. The UE may determine whether the measured CBR corresponds to the min/max value of the CBR range 1340 and thus determine the CBR level 1330. Referring to FIG. 13, up to X=16 CBR levels may be distinguished. Thus, the UE may refer to the transmission parameter range 1350 corresponding to the CBR range 1340, the CBR level 1330, and/or the priority 1320 of the signal to be transmitted for congestion control. In case that using only the CBR without using the priority in the congestion control of the SL positioning signal, the UE may refer to the CBR level 1330 and the transmission parameter range 1350 corresponding to the CBR level.

The transmission parameter range 1350 related to the SL positioning signal is described below in detail.

A Channel Occupancy Ratio (CR)-Limit

According to an embodiment, the CR-Limit indicates a CR upper limit. For example, the CR is a measurement value indicating an extent to which the UE occupies or is to occupy the channel, which is described below in the seventh embodiment. The UE may measure the CR and perform congestion control to decrease the corresponding measurement value to below the CR-Limit. For example, the CR-Limit may be set to a lower value for a busy channel (e.g., a high CBR level). As the priority increases, the UE may set the CR-Limit to a higher value. In FIG. 13 the corresponding value may be set in a range of INTEGER (0 . . . 10000).

Combsize, Comb-Offset

Herein, a combsize is the comb size of the SL-PRS, in regard to which FIG. 8 and FIG. 9 illustrated that the SL-PRS may be transmitted in various comb sizes. The UE may perform congestion control through the Comb Size control. For example, the CR-Limit may be set to a lower value for the busy channel (e.g., a high CBR level). As CombSize decreases, a probability of the SL-PRS collision in the busy channel may increase. In FIG. 13 the corresponding value may be set in the range of INTEGER (2, 4, 6, 12). The Comb-offset value indicates a start position of the comb pattern on the frequency axis (or, frequency domain). The UE may adjust the Comb-offset value to avoid SL-PRS transmission collision between UEs. However, the Comb-offset value may not be included in the value determined based on the congestion control.

SymbolLength

SymbolLength is a symbol length allocable for the SL-PRS in one slot, in relation to which FIG. 8 and FIG. 9 have described that the SL-PRS may be designed in various symbol lengths. The UE may perform the congestion control through the SymbolLength control. For example, SymbolLength may be set to a lower value for the busy channel (e.g., a high CBR level). As SymbolLength increases, the probability of the SL-PRS collision in the busy channel may increase. Referring to FIG. 13 the corresponding value may be set in the range of INTEGER (2, 4, 6, 12).

RBdensity

An RBdensity is a density on the frequency axis (or, frequency domain) transmitting the SL-PRS and may indicate whether the SL-PRS is transmitted every RB on the frequency domain with the RB-based density of 1, whether the SL-PRS is transmitted every two RBs on the frequency domain with RB-based density of ½, and/or whether the SL-PRS is transmitted every four RBs on the frequency domain with the RB-based density of ¼. The UE may perform the congestion control through the RBdensity control. For example, RBdensity may be set to a lower value for the busy channel (e.g., a high CBR level). As RBdensity increases, the probability of the SL-PRS collision in the busy channel may increase. Referring to FIG. 13, the corresponding value may be set in a range of (1, ½, ¼).

MinBWSubChannelNum, MaxSubchannelNum

A MinBWSubChannelNum and MaxSubchannelNum indicate the minimum number and the maximum number of sub-channels allocable for the SL-PRS in one slot. The UE may perform congestion control through MinBWSubChannelNum and MaxSubchannelNum control. For example, the number of the sub-channels allocable for the SL-PRS may be set to a lower value for the busy channel (e.g., a high CBR level). As the number of the allocable sub-channels increases, the probability of the SL-PRS collision in the busy channel may increase. Referring to FIG. 13, the corresponding value may be set in a range of INTEGER (1 . . . 27). MinBWSubChannelNum and MaxSubchannelNum may perform a congestion control function with a value determining the frequency region in which the SL-PRS is transmitted, the RB start portion of the sub-channel, and the number of the sub-channels.

MaxTxRepetition

A MaxTxRepetition is a maximum value of the SL-PRS repetition and the SL-PRS repetition indicates that the SL-PRS is repeatedly transmitted in one or more slots. The UE may perform congestion control through the MaxTxRepetition control. For example, a MaxTxRepetition value may be set to a lower value for the busy channel (e.g., a high CBR level). As the SL-PRS repetition increases, the probability of the SL-PRS collision in the busy channel may increase. Referring to FIG. 13, the corresponding value may be set in a range of (1 . . . 4).

MaxTxPower ($P_{MAX,CBR}$)

A MaxTxPower indicates a maximum value of the SL-PRS power. The UE may perform congestion control through MaxTxPower control. For example, a MaxTxPower value may be set to a lower value for the busy channel (e.g., a high CBR level). As MaxTxPower increases in number, the probability of the SL-PRS collision in the busy channel may increase. Referring to FIG. 13, the corresponding value may be set in a range of INTEGER (−30 . . . 33).

Herein, the SL-PRS transmission parameters are not limited to the above parameters. For example, an SL-PRS muting pattern may be further considered as the SL-PRS transmission parameter. The SL-PRS muting pattern is to minimize SL-PRS interference by not transmitting the SL-PRS at specific timings in periodic SL-PRS transmission. Thus, the SL-PRS muting pattern may be adjusted according to the SL channel congestion.

The sixth embodiment defines the CBR to perform congestion control for the positioning signal transmission. The CBR indicates an extent to which a current channel is occupied by UEs and may be used to determine whether the corresponding SL channel is busy. The UE may determine (or, obtain) whether the corresponding channel is busy, based on a CBR value measured by the following CBR definition. The UE may report the measured CBR to the base station. For example, if the base station and the UE are connected via Uu-RRC, the UE may report the measured CBR value to the base station via the Uu-RRC. The following embodiment describes the CBR measurement based on an SL received signal strength indicator (RSSI) and the SL-PRS. The method for measuring the CBR is not limited to the following method. If the CBR is measured based on the SL RSSI, the CBR measured in a slot n may be defined as follows.

CBR Measurement Based on SL RSSI

In a resource pool, the SL RSSI measured by the UE may be defined as a ratio of sub-channels exceeding a (pre-)configured threshold. The CBR measurement may be performed in a slot [n−X, n−1]. The slot index is based on a physical slot index.

X is a window value of the CBR management, and its value may be fixed or configured. For example, the value X may be a fixed value of 100 slots or a value determined based on a subcarrier spacing (SCS) μ as $100 \cdot 2^\mu$ slots. However, the disclosure does not limit the method for determining the value X, that is, the method for determining the CBR measurement window to the above method.

The SL RSSI is a received signal strength and may indicate a power (in [W]) received at the UE. The SL RSSI may be defined as an average receive power observed in the symbols corresponding to the PSCCH and PSSCH regions from the OFDM symbol following the AGC symbol and the corresponding sub-channels as shown in the first SL slot structure 1210 of FIG. 12.

If the CBR is measured for the SL-PRS, the CBR measured in the slot n may be defined as below.

CBR Measurement on SL-PRS (Method 1)

The CBR may be defined as the ratio of the sub-channels transmitting the SL-PRS in which an SL PRS-RSSI measured by the UE in the resource pool exceeds the (pre-)configured threshold. The CBR measurement may be performed in the slot [n−X, n−1]. The slot index is based on the physical slot index.

X is the window value of the CBR management and has a fixed or configured value. For example, the value X may be the fixed value of 100 slots or may be determined based on the SCS μ as $100 \cdot 2^\mu$ slots. However, the disclosure does not limit the method for determining the value X, that is, the method for determining the CBR measurement window to the above method.

The SL PRS-RSSI is an SL-PRS received signal strength and may indicate a power (in [W]) received at the UE. The SL PRS-RSSI may be defined as an average SL-PRS receive power observed in the OFDM symbols transmitting the SL-PRS and the corresponding sub-channels as shown in the second SL slot structure 1220, the third SL slot structure 1230 and/the fourth SL slot structure 1240 of FIG. 12. The SL PRS-RSSI may be replaced by another term.

CBR Measurement on SL-PRS (Method 2)

The CBR may be defined as a ratio of RBs transmitting the SL-PRS in which the SL PRS-RSSI measured by the UE in the resource pool exceeds the (pre-)configured threshold. The CBR measurement may be performed in the slot [n−X, n−1]. The slot index is based on the physical slot index.

X is the window value of the CBR management and may have a fixed or configured value. For example, the value X may be the fixed value of 100 slots or may be determined based on the SCS μ as $100 \cdot 2^\mu$ slots. However, the disclosure does not limit the method for determining the value X, that is, the method for determining the CBR measurement window to the above method.

The SL PRS-RSSI is the SL-PRS received signal strength and may indicate the power (in [W]) received at the UE. The SL PRS-RSSI may be defined as the average SL-PRS receive power observed in the OFDM symbols transmitting the SL-PRS and the corresponding RB region as shown in the second SL slot structure 1220, the third SL slot structure 1230 and/the fourth SL slot structure 1240 of FIG. 12. The SL PRS-RSSI may be replaced by another term.

CBR Measurement on SL-PRS (Method 3)

The CBR may be defined as a ratio of resource elements (REs) transmitting the SL-PRS in which the SL PRS-RSSI measured by the UE in the resource pool exceeds the (pre-)configured threshold. The CBR measurement may be performed in the slot [n–X, n–1]. The slot index is based on the physical slot index.

X is the window value of the CBR management and may have a fixed or configured value. For example, the value X may be the fixed value of 100 slots or the value determined based on the SCS µ as $100 \cdot 2^\mu$ slots. However, the disclosure does not limit the method for determining the value X, that is, the method for determining the CBR measurement window to the above method.

The SL PRS-RSSI is the SL-PRS received signal strength and may indicate the power (in [W]) received at the UE. The SL PRS-RSSI may be defined as the average SL-PRS receive power observed in the OFDM symbols transmitting the SL-PRS and the corresponding RE region as shown in the second SL slot structure 1220, the third SL slot structure 1230 and/the fourth SL slot structure 1240 of FIG. 12. The SL PRS-RSSI may be replaced by another term.

The seventh embodiment defines the CR to perform congestion control on the positioning signal transmission. The CR may be the measurement value indicating an extent to which the UE occupies or is to occupy the channel. The UE may measure the CR and perform congestion control to decrease the measurement value to below the CR-Limit. If the corresponding measurement value does not satisfy the CR-Limit, the UE may drop the corresponding transmission or adjust other transmission parameter to satisfy the CR-Limit in UE implementation.

Hereafter, the CR may be defined differently in the CR measurement on data transmitted in the PSSCH region and the measurement on the SL-PRS. If the CR is measured in the data transmitted in the PSSCH region, the CBR measured in slot n may be defined as below.

If the CR is Measured in Data Transmitted in the PSSCH Region

The CBR is defined by dividing a sum of the number of sub-channels used by the UE by occupying the channel at a slot [n–a, n–1] and the number of sub-channels allowed to use by occupying the channel at a slot [n, n+b] by the total number of sub-channels configured as the Tx resource pool at a slot [n–a, n+b]. The slot index is based on the physical slot index.

When a is a positive integer, and b is 0 or a positive integer, the values a and b may be a fixed value as a+b+1=1000 slots or a value determined based on the SCS µ as $a+b+1=1000 \cdot 2^\mu$ slots. The values a and b may satisfy b<(a+b+1)/2 in UE implementation. n+b may not be set to a value exceeding the last transmission opportunity allowed through Tx resource reservation. However, the disclosure does not limit the method for determining the value a or b, that is, the method for determining the CR measurement window to the above method.

If the CR is measured on the S-PRS, the CBR measured in the slot n may be defined as below.

If the CR is Measured on the SL-PRS

Method 1: The CBR is defined by dividing the sum of the number of the sub-channels transmitting the SL-PRS used by the UE by occupying the channel at the slot [n–a, n–1] and the number of the sub-channels transmitting the SL-PRS allowed to use by occupying the channel at the slot [n, n+b] by the total number of the sub-channels configured as the Tx resource pool at the slot [n–a, n+b]. The slot index is based on the physical slot index.

Method 2: The CBR is defined by dividing the sum of the number of RBs transmitting the SL-PRS used by the UE by occupying the channel at the slot [n–a, n–1] and the number of RBs transmitting the SL-PRS allowed to use by occupying the channel at the slot [n, n+b] by the total number of RBs configured as the Tx resource pool at the slot [n–a, n+b]. The slot index is based on the physical slot index.

Method 3: The CBR is defined by dividing the sum of the number of REs transmitting the SL-PRS used by the UE by occupying the channel at the slot [n–a, n–1] and the number of REs transmitting the SL-PRS allowed to use by occupying the channel at the slot [n, n+b] by the total number of REs configured as the Tx resource pool at the slot [n–a, n+b]. The slot index is based on the physical slot index.

When a is a positive integer, and b is 0 or a positive integer, the values a and b may be a fixed value as a+b+1=1000 slots or a value determined based on the SCS µ as $a+b+1=1000 \cdot 2^\mu$ slots. The values a and b may satisfy b<(a+b+1)/2 in UE implementation. n+b may not be set to a value exceeding the last transmission opportunity allowed through the Tx resource reservation. However, the disclosure does not limit the method for determining the value a or b, that is, the method for determining the CR measurement window to the above method.

The eighth embodiment describes a method for performing the power control in the positioning. For example, power control may be performed in the SL-PRS and may consider the following conditions. However, the conditions considered in the power control are not limited to the following conditions.

Condition 1: SL-PRS Pattern

In the SL-PRS power control, a power control method may be determined by the SL-PRS pattern, that is, how the corresponding signal is mapped to Tx resources on the time axis (or, time domain) and the frequency axis (or, frequency domain) and transmitted. The disclosure may consider the following detailed conditions in relation to the SL-PRS pattern.

Condition 1-1: The SL-PRS may not be FDMed with other SL channels and signals and transmitted. The number of the RBs transmitting the SL-PRS is defined as $M_{RB}^{S-PRS}$.

Condition 1-1 is a method for avoiding interference with other channels and signals by transmitting only the SL-PRS in the symbol transmitting the SL-PRS. Thus, the positioning accuracy may be ensured. The SL-PRS patterns in above-described FIG. 8 and FIG. 9 are based on Condition 1-1.

Condition 2: Pathloss

In the SL-PRS power control, the power control method may be determined by a pathloss calculation scheme. The disclosure may consider the following detailed conditions in relation to the pathloss.

Condition 2-1: The SL-PRS power control is performed based on DL pathloss.

Condition 2-2: The SL-PRS power control is performed based on SL pathloss.

Condition 2-3: The SL-PRS power control is performed based on DL and SL pathloss.

Condition 3: $P_{MAX,CBR}$ $P_{MAX,CBR}$ is the maximum power value configured for congestion control, and the UE may determine the transmission parameter based on the CBR and the priority. In so doing, the transmission parameter may include the SL-PRS power maximum value, which is described by MaxTxpower of the fifth embodiment. The disclosure may consider the following detailed conditions in relation to $P_{MAX,CBR}$. If determining one of the following detailed conditions, the UE may determine $P_{MAX,CBR}$. Alternatively, one of the following detailed conditions may be (pre-)configured. By contrast, one or more of the following detailed conditions may be selected. If one or more of the following detailed conditions are selectable, one or more of the following detailed conditions may be (pre-)configured and the UE may need to select the method to apply. In this case, a method for determining the detailed condition may be considered in UE implementation.

Condition 3-1: The value $P_{MAX,CBR}$ is determined with the CBR measured based on the SL RSSI and the priority of the data transmitted in the PSSCH transmission region.

The CBR measured based on the SL RSSI in Condition 3-1 shall be described in relation to the sixth embodiment. In Condition 3-1, the value $P_{MAX,CBR}$ is determined using the data priority if the SL-PRS is TDMed with the data and transmitted and received in the PSSCH resource region, which is explained in the fourth embodiment.

Condition 3-2: The value $P_{MAX,CBR}$ is determined with the CBR measured based on the SL RSSI and the priority of the SL-PRS.

The CBR measured based on the SL RSSI in Condition 3-2 shall be described in relation to the sixth embodiment. In Condition 3-2, the value $P_{MAX,CBR}$ is determined using the SL-PRS priority if the SL-PRS is TDMed with the data and transmitted and received in the PSSCH resource region, which is explained in the fourth embodiment.

Condition 3-3: The value $P_{MAX,CBR}$ is determined with the CBR measured in the SL-PRS transmission region and the priority of the data transmitted in the PSSCH transmission region.

The CBR measured in the SL-PRS transmission region in Condition 3-3 shall be described in relation to the sixth embodiment. In Condition 3-3, the value $P_{MAX,CBR}$ is determined using the data priority if the SL-PRS is TDMed with the data and transmitted and received in the PSSCH resource region, which is explained in the fourth embodiment.

Condition 3-4: The value $P_{MAX,CBR}$ is determined with the CBR measured in the SL-PRS transmission region and the priority of the SL-PRS.

The CBR measured in the SL-PRS transmission region in Condition 3-4 shall be described in relation to the sixth embodiment. In Condition 3-4, the value $P_{MAX,CBR}$ is determined using the SL-PRS priority if the SL-PRS is TDMed with the data and transmitted and received in the PSSCH resource region, which is explained in the fourth embodiment.

Condition 3-5: Two values of $P_{MAX,CBR,1}$ and $P_{MAX,CBR,2}$ are used.

In Condition 3-5, $P_{MAX,CBR,1}$ may be determined using the CBR measured based on the SL RSSI in Condition 1-1 and the priority of the data transmitted in the PSSCH transmission region. $P_{MAX,CBR,2}$ may be determined with the CBR measured in the SL-PRS transmission region in Condition 3-4 and the SL-PRS priority. However, the method for determining the values $P_{MAX,CBR,1}$ and $P_{MAX,CBR,2}$ in Condition 3-5 are not limited thereto. For example, the other conditions suggested may be used to determine the values $P_{MAX,CBR,1}$ and $P_{MAX,CBR,2}$.

Condition 4: Power Control Level

The power control level indicates whether the SL-PRS power control is based on open loop power control (OLPC) or closed loop power control (CLPC). The power control method may be determined based on the adopted type. Hence, the following detailed conditions may be considered in relation to the power control level. The disclosure is focused on the OLPC.

Condition 4-1: The SL-PRS power control is performed based on the OLPC.

Condition 4-2: The SL-PRS power control is performed based on the CLPC.

Specific methods for performing the S-PRS power control by applying the above conditions shall be described in FIG. 9 through FIG. 12. The ninth embodiment describes the SL-PRS power control method if Condition 1-1, Condition 2 (including 2-1/2-2), Condition 3 (including 3-1/3-2/3-3/3-4) and Condition 4-1 considered in the eighth embodiment are applied. In this case, the SL-PRS power control may include the parameter functions including maximum output power value of UE, a UE maximum power value configured for congestion control, a target receive power (based on DL or SL), a subcarrier spacing (SCS), the number of RBs transmitting SL-PRS, a pathloss (based on DL or SL), and a pathloss correction value.

For example, the UE may adjust SL-PRS power $P_{S\text{-}PRS}(i)$ at an SL-PRS Tx timing i based on Equation (6) as follows.

$$P_{S\text{-}PRS}(i) = \min(P_{CMAX}, P_{MAX,CBR}, P_{O,S\text{-}PRS} + 10 \log_{10}(2^\mu \cdot M_{RB}^{S\text{-}PRS}) + \alpha_{S\text{-}PRS} \cdot PL) \quad (6)$$

In Equation (6), $P_{CMAX}$ is referred to the configured UE maximum output power value.

$P_{MAX,CBR}$ denotes the configured UE maximum output power value for the congestion control. Detailed description thereof refers to the fifth embodiment. One $P_{MAX,CBR}$ value may be determined by applying Conditions 3-1/3-2/3-3/3-4 disclosed in the eighth embodiment.

$P_{O,S\text{-}PRS}$ denotes the target receive power. Its value may be determined based on DL receive power according to Condition 2-1 and based on the SL receive power according to Condition 2-2 disclosed in the eighth embodiment. The value may be configured as described above and may be set to $P_{O,S\text{-}PRS} = P_{CMAX}$, in case that the value is not provided.

$\mu$ is determined according to the SCS and has a value of $\mu = \{0, 1, 2, 3, 4\}$ with respect to SCS=$\{15, 30, 60, 120, 240\}$ kHz.

$M_{RB}^{S\text{-}PRS}$ denotes the number of the RBs transmitting the SL-PRS.

PL is referred to the pathloss and may be determined to use the DL pathloss (PL=$PL_D$) according to Condition 2-1 and to use the SL pathloss (PL=$PL_{SL}$) according to Condition 2-2 disclosed in the eighth embodiment. Using the SL pathloss, its application may be limited to the unicast, a pair UE may report an SL-reference signal received power (RSRP) to a Tx UE, and the Tx UE may calculate the SL pathloss based on a reference signal power.

$\alpha_{S\text{-}PRS}$ is a value applied to correct PL, its corresponding value may be set as above, and $\alpha_{S\text{-}PRS}=1$ may be set if the corresponding value is not provided.

Equation (6) is the example of the ninth embodiment and may be an alternative expression having the same effect.

The tenth embodiment discloses an SL-PRS power control method according to Condition 1-1, Condition 2-3, Condition 3 (including 3-1/3-2/3-3/3-4), and Condition 4-1 considered in the eighth embodiment. The SL-PRS power control may include parameter functions such as maximum output power value of UE, the UE maximum power value configured for congestion control, the target receive power (based on DL and/or SL), the SCS, the number of RBs transmitting SL-PRS, the pathloss (based on DL and/or SL), and the pathloss correction value (based on DL and/or SL). However, the disclosure is not limited thereto.

Specifically, the UE may control the SL-PRS power $P_{S\text{-}PRS}(i)$ at the SL-PRS Tx timing i based on Equation (7) as follows.

$$P_{S\text{-}PRS}(i)=\min(P_{CMAX}, P_{MAX,CBR}, \min(P_{S\text{-}PRS,D}(i), P_{S\text{-}PRS,SL}(i))) \quad (7)$$

In Equation (7), $P_{CMAX}$ is referred to the configured UE maximum output power value.

$P_{MAX,CBR}$ is referred to the configured UE maximum output power value for congestion control. Detailed description thereof refers to the fifth embodiment. One $P_{MAX,CBR}$ value may be determined by applying Conditions 3-1/3-2/3-3/3-4 disclosed in the eighth embodiment.

$P_{S\text{-}PRS,D}(i) = P_{O,S\text{-}PRS,D} + 10 \log_{10}(2^{\mu} \cdot M_{RB}^{S\text{-}PRS}) + \alpha_{S\text{-}PRS} \cdot PL_D$ in case that the value of $P_{OS\text{-}PRS,D}$ is provided to the upper level, whereas $P_{S\text{-}PRS,D}(i) = P$ ow if the corresponding value is not provided. In Equation (7), $\mu$ is determined according to the SCS, and $\mu=\{0, 1, 2, 3, 4\}$ is with respect to SCS=$\{15, 30, 60, 120, 240\}$ kHz. $M_{RB}^{S\text{-}PRS}$ denotes the number of the RBs transmitting the SL-PRS. $PL_D$ denotes the DL pathloss. $\alpha_{S\text{-}PRS}$ is applied to correct $PL_D$, its corresponding value may be set as above, and $\alpha_{S\text{-}PRS}=1$ may be set if the corresponding value is not provided.

$P_{S\text{-}PRS,SL}(i) = P_{O,S\text{-}PRS,SL} = 10 \log_{10}(2^{\mu} \cdot M_{RB}^{S\text{-}PRS}) \cdot \alpha_{S\text{-}PRS} \cdot PL_{SL}$ in case that the value of $P_{O,S\text{-}PRS,SL}$ is provided to the higher level, whereas $P_{S\text{-}PRS,SL}(i) = P_{CMAX}$ if the corresponding value is not provided. In Equation (7), $\mu$ is determined according to the SCS, and $\mu=\{0, 1, 2, 3, 4\}$ is with respect to SCS=$\{15, 30, 60, 120, 240\}$ kHz. $M_{RB}^{S\text{-}PRS}$ denotes the number of the RBs transmitting the SL-PRS. $PL_{SL}$ denotes the SL pathloss. The SL pathloss may be limited to the unicast in its application, the pair UE may report the SL-RSRP to the Tx UE, and the Tx UE may calculate the SL pathloss based on the reference signal power. $\alpha_{S\text{-}PRS}$ is applied to correct $PL_{SL}$, its corresponding value may be set as above, and $\alpha_{S\text{-}PRS}=1$ may be set if the corresponding value is not provided.

Equation (7) is the example of the tenth embodiment and may have another expression providing the same effect. For example, if the value of $P_{O,S\text{-}PRS,D}$ is not provided to the higher level, $P_{O,S\text{-}PRS,D}=\min(P_{CMAX}, P_{MAX,CBR})$. In case that the value of $P_{O,S\text{-}PRS,SL}$ is not provided to the higher level, $P_{O,S\text{-}PRS,SL}=\min(P_{CMAX}, P_{MAX,CBR})$ or $P_{O,S\text{-}PRS,SL}=\min(P_{CMAX}, P_{O,S\text{-}PRS,D})$.

The eleventh embodiment discloses an SL-PRS power control method according to Condition 1-1, Condition 2 (including 2-1/2-2), Condition 3-5, and Condition 4-1 considered in the eighth embodiment. The SL-PRS power control may include a maximum output power value of UE, a first UE maximum power value configured for congestion control, a second UE maximum power value configured for congestion control, a target receive power (based on DL or SL), SCS, the number of RBs transmitting SL-PRS, pathloss (based on DL or SL), and a pathloss correction value, but the disclosure is not limited thereto.

For example, the power control may be performed based on Equation (8) as follows.

$$P_{S\text{-}PRS}(i)=\min(P_{CMAX}, P_{MAX,CBR,1}, P_{MAX,CBR,2}, P_{O,S\text{-}PRS}+10 \log_{10}(2^{\mu} \cdot M_{RB}^{S\text{-}PRS})+\alpha_{S\text{-}PRS} \cdot PL) \quad (8)$$

In Equation (8), $P_{CMAX}$ denotes the configured UE maximum output power value.

$P_{MAX,CBR,1}$ denotes the first UE maximum output power value configured for the congestion control. Detailed description thereof refers to the fifth embodiment. The first UE maximum output power value $P_{MAX,CBR,1}$ configured for the congestion control may be determined by applying Condition 3-5 disclosed in the eighth embodiment.

$P_{MAX,CBR,2}$ denotes the second UE maximum output power value configured for the congestion control. Detailed description thereof refers to the fifth embodiment. The second UE maximum output power value $P_{MAX,CBR,2}$ configured for the congestion control may be determined by applying Condition 3-5 disclosed in the eighth embodiment.

$P_{O,S\text{-}PRS}$ denotes the target receive power. Its value may be determined based on the DL receive power according to Condition 2-1 and may be determined based on the SL receive power according to Condition 2-2 disclosed in the eighth embodiment. The corresponding value may be configured as described above and may be set to $P_{O,S\text{-}PRS} = P_{CMAX}$ if the corresponding value is not provided.

$\mu$ is determined according to the SCS and has the value of $\mu=\{0, 1, 2, 3, 4\}$ with respect to SCS=$\{15, 30, 60, 120, 240\}$ kHz.

$M_{RB}^{S\text{-}PRS}$ denotes the number of the RBs transmitting the SL-PRS.

PL denotes the pathloss and may be determined to use the DL pathloss (PL=$PL_D$) according to Condition 2-1 and to use the SL pathloss (PL=$PL_{SL}$) according to Condition 2-2 disclosed in the eighth embodiment. Using the SL pathloss, its application may be limited to the unicast, the pair UE may report the SL-RSRP to the Tx UE, and the Tx UE may calculate the SL pathloss based on the reference signal power.

$\alpha_{S\text{-}PRS}$ is a value applied to correct PL, its corresponding value may be set as described above, and $\alpha_{S\text{-}PRS}=1$ may be set if the corresponding value is not provided.

Equation (8) is an example of the eleventh embodiment and may be expressed as another expression having the same effect. For example, Equation (8) may additionally adopt $P_{MAX,CBR}=\min(P_{MAX,CBR,1}, P_{MAX,CBR,2})$ or may be expressed as Equation) (4) if it is (pre-)configured or indicated from the base station or other UE to use one of $P_{MAX,CBR,1}$ and $P_{MAX,CBR,2}$ as $P_{MAX,CBR}$.

The twelfth embodiment discloses an SL-PRS power control method according to Condition 1-1, Condition 2-3, Condition 3-5, and Condition 4-1 considered in the eighth embodiment. The SL-PRS power control may include maximum output power value of UE, first UE maximum power value configured for congestion control, second UE maximum power value configured for congestion control, target receive power (based on DL and/or SL), SCS, the number of RBs transmitting SL-PRS, pathloss (based on DL and/or SL), and pathloss correction value (based on DL and/or SL), but the disclosure is not limited thereto.

For example, the power control may be performed based on Equation (9) as follows.

$$P_{S\text{-}PRS}(i)=\min(P_{CMAX}, P_{MAX,CBR,1}, P_{MAX,CBR,2}, \min(P_{S\text{-}PRS,D}(i), P_{S\text{-}PRS,SL}(i))) \quad (9)$$

In Equation (9), $P_{CMAX}$ denotes the configured UE maximum output power value.

$P_{MAX,CBR,1}$ denotes the first UE maximum output power value configured for the congestion control. Detailed description thereof refers to the fifth embodiment. The first UE maximum output power value $P_{MAX,CBR,1}$ configured for the congestion control may be determined by applying Condition 3-5 disclosed in the eighth embodiment.

$P_{MAX,CBR,2}$ denotes the second UE maximum output power value configured for the congestion control. Detailed description thereof refers to the fifth embodiment. The second UE maximum output power value $P_{MAX,CBR,2}$ configured for the congestion control may be determined by applying Condition 3-5 disclosed in the eighth embodiment.

$P_{S\text{-}PRS,D}(i) = P_{O,S\text{-}PRS,D} + 10 \log_{10}(2^\mu \cdot M_{RB}^{S\text{-}PRS}) + \alpha_{S\text{-}PRS} \cdot PL_D$ in case that the value of $P_{O,S\text{-}PRS,D}$ is provided to the higher level, whereas $P_{S\text{-}PRS,D}(i) = P_{CMAX}$ if the value is not provided. In Equation 6, $\mu$ is determined according to the SCS, and $\mu = \{0, 1, 2, 3, 4\}$ is with respect to SCS=$\{15, 30, 60, 120, 240\}$ kHz. $M_{RB}^{S\text{-}PRS}$ denotes the number of the RBs transmitting the SL-PRS. $PL_D$ denotes the DL pathloss. $\alpha_{S\text{-}PRS}$ is applied to correct $PL_D$, its corresponding value may be set as described above, and $\alpha_{S\text{-}PRS}=1$ may be set if the corresponding value is not provided.

$P_{S\text{-}PRS,SL}(i) = P_{O,S\text{-}PRS,SL} + 10 \log_{10}(2^\mu \cdot M_{RB}^{S\text{-}PRS}) + \alpha \cdot PL_{SL}$ in case that the value of $P_{O,S\text{-}PRS,SL}$ is provided to the higher level, whereas $P_{S\text{-}PRS,SL}(i) = P_{CMAX}$ if the value is not provided. In Equation 6, $\mu$ is determined according to the SCS, and $\mu = \{0, 1, 2, 3, 4\}$ is with respect to SCS=$\{15, 30, 60, 120, 240\}$ kHz. $M_{RB}^{S\text{-}PRS}$ denotes the number of the RBs transmitting the SL-PRS. $PL_{SL}$ denotes the SL pathloss. The SL pathloss may be limited to the unicast in its application, the pair UE may report the SL-RSRP to the Tx UE, and the Tx UE may calculate the SL pathloss based on the reference signal power. $\alpha_{S\text{-}PRS}$ is applied to correct $PL_{SL}$, its corresponding value may be set as described above, and $\alpha_{S\text{-}PRS}=1$ may be set if the corresponding value is not provided.

Equation (9) is an example of the twelfth embodiment and may be expressed as another expression having the same effect. For example, if the value of $P_{O,S\text{-}PRS,D}$ is not provided to the higher level, $P_{O,S\text{-}PRS,D} = \min(P_{CMAX}, P_{MAX,CBR})$ If the value of $P_{O,S\text{-}PRS,SL}$ is not provided to the higher level, $P_{O,S\text{-}PRS,SL} = \min(P_{CMAX}, P_{MAX,CBR})$ or $P_{O,S\text{-}PRS,SL} = \min(P_{CMAX}, P_{O,S\text{-}PRS,D})$ In addition, Equation (9) may additionally adopt $P_{MAX,CBR} = \min(P_{MAX,CBR,1}, P_{MAX,CBR,2})$ or may be expressed as Equation (5) if it is (pre-)configured or indicated from the base station or other UE to use one of $P_{MAX,CBR,1}$ and $P_{MAX,CBR,2}$ as $P_{MAX,CBR}$.

Figure 14:
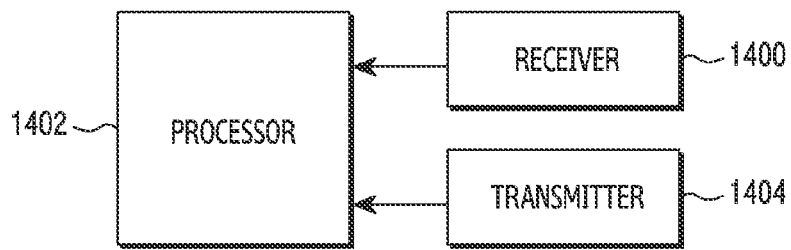
FIG. 14 illustrates a terminal according to an embodiment.
Figure 15:
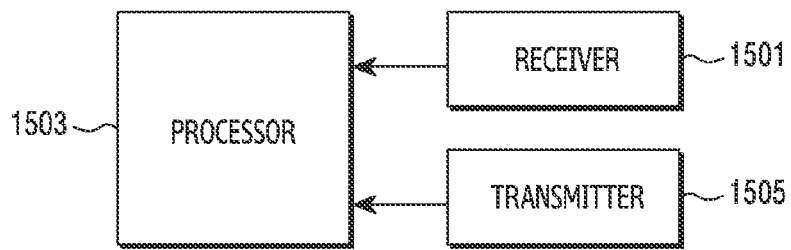
FIG. 15 illustrates a base station according to an embodiment.

To fulfill the embodiments of the disclosure, a transmitter, a receiver, and a processor of the UE and the base station are shown in FIG. 14 and FIG. 15 respectively. The embodiments provide the method for the UE to perform the positioning in the SL, and for doing so, the receiver, the processor, and the transmitter of the base station and the UE should operate according to the respective embodiments.

According to an embodiment, a method performed by a first user equipment (UE) in a wireless communication system is provided. The method comprises identifying a transmission power for a sidelink-positioning reference signal (SL-PRS) based on a maximum power for a congestion control, and transmitting, to a second UE, the SL-PRS on an SL bandwidth part (BWP) based on the transmission power. In case that a resource for the SL-PRS is common for the SL-PRS and a physical sidelink shared channel (PSSCH), the maximum power for the congestion control is identified based on a channel busy ratio (CBR) measured for the PSSCH and a priority level.

The maximum power for the congestion control is identified based on the CBR measured for the PSSCH and the priority level for the SL-PRS.

The maximum power for the congestion control is identified based on the CBR measured for the PSSCH and the priority level for the PSSCH.

In case that the resource for the SL-PRS is dedicated for the SL-PRS, the maximum power for the congestion control is identified based on a CBR measured for the SL-PRS and a priority level for the SL-PRS.

The SL-PRS and the PSSCH are time division multiplexed (TDMed) in the resource which is common for the SL-PRS and the PSSCH.

According to an embodiment, a first user equipment (UE) in a wireless communication system is provided. The first UE comprises a transceiver and a controller coupled with the transceiver and configured to identify a transmission power for a sidelink-positioning reference signal (SL-PRS) based on a maximum power for a congestion control, and transmit, to a second UE, the SL-PRS on an SL bandwidth part (BWP) based on the transmission power. In case that a resource for the SL-PRS is common for the SL-PRS and a physical sidelink shared channel (PSSCH), the maximum power for the congestion control is identified based on a channel busy ratio (CBR) measured for the PSSCH and a priority level.

The maximum power for the congestion control is identified based on the CBR measured for the PSSCH and the priority level for the SL-PRS.

The maximum power for the congestion control is identified based on the CBR measured for the PSSCH and the priority level for the PSSCH.

In case that the resource for the SL-PRS is dedicated for the SL-PRS, the maximum power for the congestion control is identified based on a CBR measured for the SL-PRS and a priority level for the SL-PRS.

The SL-PRS and the PSSCH are time division multiplexed (TDMed) in the resource which is common for the SL-PRS and the PSSCH.

According to an embodiment, a method performed by a second user equipment (UE) in a wireless communication system is provided. The method comprises receiving, from a first UE, a first sidelink-positioning reference signal (SL-PRS) on an SL bandwidth part (BWP), and transmitting, to the first UE, a second SL-PRS as a response of the first SL-PRS. A transmission power for the first SL-PRS is based on a maximum power for a congestion control. In case that a resource for the first SL-PRS is common for the first SL-PRS and a physical sidelink shared channel (PSSCH), the maximum power for the congestion control is based on a channel busy ratio (CBR) measured for the PSSCH and a priority level.

The maximum power for the congestion control is based on the CBR measured for the PSSCH and the priority level for the first SL-PRS.

The maximum power for the congestion control is based on the CBR measured for the PSSCH and the priority level for the PSSCH.

In case that the resource for the first SL-PRS is dedicated for the first SL-PRS, the maximum power for the congestion control is based on a CBR measured for the first SL-PRS and a priority level for the first SL-PRS.

The first SL-PRS and the PSSCH are time division multiplexed (TDMed) in the resource which is common for the first SL-PRS and the PSSCH.

According to an embodiment, a second user equipment (UE) in a wireless communication system is provided. The second UE comprises a transceiver; and a controller coupled with the transceiver and configured to receive, from a first UE, a first sidelink-positioning reference signal (SL-PRS) on an SL bandwidth part (BWP), and transmit, to the first UE, a second SL-PRS as a response of the first SL-PRS. A transmission power for the first SL-PRS is based on a maximum power for a congestion control. In case that a resource for the first SL-PRS is common for the first SL-PRS and a physical sidelink shared channel (PSSCH), the maximum power for the congestion control is based on a channel busy ratio (CBR) measured for the PSSCH and a priority level.

The maximum power for the congestion control is based on the CBR measured for the PSSCH and the priority level for the first SL-PRS.

The maximum power for the congestion control is based on the CBR measured for the PSSCH and the priority level for the PSSCH.

In case that the resource for the first SL-PRS is dedicated for the first SL-PRS, the maximum power for the congestion control is based on a CBR measured for the first SL-PRS and a priority level for the first SL-PRS.

The first SL-PRS and the PSSCH are time division multiplexed (TDMed) in the resource which is common for the first SL-PRS and the PSSCH.

FIG. 14 illustrates a terminal according to an embodiment.

Referring to FIG. 14, the terminal includes a receiver 1400, a transmitter 1404, and/or a processor 1402. The receiver 1400 and the transmitter 1404 may be collectively referred to as a transceiver herein. The transceiver may transmit and/or receive signals to and/or from the base station. The signal may include control information and data. For doing so, the transceiver may include a radio frequency (RF) transmitter for up-converting and amplifying a signal to transmit in frequency, an RF receiver for low-noise-amplifying and down-converting in frequency a received signal, and so on. The transceiver may receive over a radio channel and output a signal to the processor 1402 and transmit a signal output from the processor 1402 over the radio channel. The processor 1402 may control a series of processes to operate the terminal according to the above-described embodiments.

FIG. 15 illustrates a base station according to an embodiment of the disclosure.

Referring to FIG. 15, the base station includes a receiver 1501, a transmitter 1505, and a processor 1503. The receiver 1501 and the transmitter 1505 may be collectively referred to as a transceiver. The transceiver may transmit and receive signals to and from the base station. The signal may include control information and data. For doing so, the transceiver may include an RF transmitter for up-converting and amplifying a signal to transmit in frequency, an RF receiver for low-noise-amplifying and down-converting a received signal in frequency, and so on. The transceiver may receive over a radio channel and output a signal to the processor 1503 and transmit a signal output from the processor 1503 over the radio channel. The processor 1503 may control a series of processes to operate the base station according to the above-described embodiments of the disclosure.

Each block of the process flowchart illustrations and combinations of the flowchart illustrations may be executed by computer program instructions. Since these computer program instructions may be mounted on a processor of a general purpose computer, a special purpose computer or other programmable data processing apparatus, the instructions executed by the processor of the computer or other programmable data processing equipment may generate means for executing functions described in the flowchart block(s). Since these computer program instructions may also be stored in a computer-usable or computer-readable memory which may direct a computer or other programmable data processing equipment to function in a particular manner, the instructions stored in the computer-usable or computer-readable memory may produce a manufacture article including instruction means which implement the function described in the flowchart block(s). Since the computer program instructions may also be loaded on a computer or other programmable data processing equipment, a series of operational steps may be performed on the computer or other programmable data processing equipment to produce a computer-executed process, and thus the instructions performing the computer or other programmable data processing equipment may provide steps for executing the functions described in the flowchart block(s).

In addition, each block may represent a portion of a module, a segment or code which includes one or more executable instructions for implementing a specified logical function(s). Also, it should be noted that the functions mentioned in the blocks may occur out of order in some alternative implementations. For example, two blocks shown in succession may in fact be executed substantially concurrently or the blocks may sometimes be executed in the reverse order depending on corresponding functionality.

While the disclosure has been described with reference to various embodiments, various changes may be made without departing from the spirit and the scope of the present disclosure, which is defined, not by the detailed description and embodiments, but by the appended claims and their equivalents.

What is claimed is:

1. A method performed by a first user equipment (UE) in a wireless communication system, the method comprising:
   identifying a transmission power for a sidelink-positioning reference signal (SL-PRS) in a first slot based on a maximum power associated with a channel busy ratio (CBR); and
   transmitting, to a second UE, the SL-PRS on a resource pool based on the transmission power,
   wherein, in case that the resource pool is used for the SL-PRS and a physical sidelink shared channel (PSSCH), the maximum power is identified based on a first CBR range for a first CBR measured in a second slot, which is earlier than the first slot by a predetermined time, and a priority level for the PSSCH and the SL-PRS.

2. The method of claim 1, wherein the predetermined time is based on a subcarrier spacing (SCS) associated with the PSSCH.

3. The method of claim 1, wherein the SL-PRS is not transmitted in a symbol in which a physical sidelink control channel (PSCCH) associated with the PSSCH is transmitted, and
   wherein the SL-PRS is not transmitted in a symbol in which a PSSCH demodulation reference signal (DMRS) is transmitted.

4. The method of claim 1, wherein, in case that the resource pool is dedicated for the SL-PRS, the maximum power is identified based on a second CBR range for a second CBR measured in the second slot and a priority level for the SL-PRS.

5. A method performed by a second user equipment (UE) in a wireless communication system, the method comprising:
receiving, from a first UE, a first sidelink-positioning reference signal (SL-PRS) on a resource pool based on a transmission power; and
transmitting, to the first UE, a second SL-PRS as a response to the first SL-PRS,
wherein the transmission power for the first SL-PRS in a first slot is based on a maximum power associated with a channel busy ratio (CBR), and
wherein, in case that the resource pool is used for the first SL-PRS and a physical sidelink shared channel (PSSCH), the maximum power is based on a first CBR range for a first CBR measured in a second slot, which is earlier than the first slot by a predetermined time, and a priority level for the PSSCH and the first SL-PRS.

6. The method of claim 5, wherein the predetermined time is based on a subcarrier spacing (SCS) associated with the PSSCH.

7. The method of claim 5, wherein the first SL-PRS is not received in a symbol in which a physical sidelink control channel (PSCCH) associated with the PSSCH is received, and
wherein the first SL-PRS is not received in a symbol in which a PSSCH demodulation reference signal (DMRS) is received.

8. The method of claim 5, wherein, in case that the resource pool is dedicated for the first SL-PRS, the maximum power is identified based on a second CBR range for a second CBR measured in the second slot and a priority level for the first SL-PRS.

9. A first user equipment (UE) in a wireless communication system, the first UE comprising:
a transceiver; and
a controller coupled with the transceiver and configured to:
identify a transmission power for a sidelink-positioning reference signal (SL-PRS) in a first slot based on a maximum power associated with a channel busy ratio (CBR), and
transmit, to a second UE, the SL-PRS on a resource pool based on the transmission power,
wherein, in case that the resource pool is used for the SL-PRS and a physical sidelink shared channel (PSSCH), the maximum power is identified based on a first CBR range for a first CBR measured in a second slot, which is earlier than the first slot by a predetermined time, and a priority level for the PSSCH and the SL-PRS.

10. The first UE of claim 9, wherein the predetermined time is based on a subcarrier spacing (SCS) associated with the PSSCH.

11. The first UE of claim 9, wherein the SL-PRS is not transmitted in a symbol in which a physical sidelink control channel (PSCCH) associated with the PSSCH is transmitted, and
wherein the SL-PRS is not transmitted in a symbol in which a PSSCH demodulation reference signal (DMRS) is transmitted.

12. The first UE of claim 9, wherein, in case that the resource pool is dedicated for the SL-PRS, the maximum power is identified based on a second CBR range for a second CBR measured in the second slot and a priority level for the SL-PRS.

13. A second user equipment (UE) in a wireless communication system, the second UE comprising:
a transceiver; and
a controller coupled with the transceiver and configured to:
receive, from a first UE, a first sidelink-positioning reference signal (SL-PRS) on a resource pool based on a transmission power, and
transmit, to the first UE, a second SL-PRS as a response to the first SL-PRS,
wherein the transmission power for the first SL-PRS in a first slot is based on a maximum power associated with a channel busy ratio (CBR), and
wherein, in case that the resource pool is used for the first SL-PRS and a physical sidelink shared channel (PSSCH), the maximum power is based on a first CBR range for a first CBR measured in a second slot, which is earlier than the first slot by a predetermined time, and a priority level for the PSSCH and the first SL-PRS.

14. The second UE of claim 13, wherein the predetermined time is based on a subcarrier spacing (SCS) associated with the PSSCH.

15. The second UE of claim 13, wherein the first SL-PRS is not received in a symbol in which a physical sidelink control channel (PSCCH) associated with the PSSCH is received, and
wherein the first SL-PRS is not received in a symbol in which a PSSCH demodulation reference signal (DMRS) is received.

16. The second UE of claim 13, wherein, in case that the resource pool is dedicated for the first SL-PRS, the maximum power is identified based on a second CBR range for a second CBR measured in the second slot and a priority level for the first SL-PRS.

* * * * *